(12) United States Patent
Tsuchihashi et al.

(10) Patent No.: US 9,654,040 B2
(45) Date of Patent: May 16, 2017

(54) DRIVE CIRCUIT OF STEPPING MOTOR, INTEGRATED CIRCUIT THEREOF, AND ELECTRONIC EQUIPMENT INCLUDING SAME, AND METHOD FOR CONTROLLING DRIVE CIRCUIT OF STEPPING MOTOR

(75) Inventors: Masanori Tsuchihashi, Kyoto (JP); Hiroki Hashimoto, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 877 days.

(21) Appl. No.: 13/981,391

(22) PCT Filed: Jan. 23, 2012

(86) PCT No.: PCT/JP2012/051325
§ 371 (c)(1),
(2), (4) Date: Jul. 24, 2013

(87) PCT Pub. No.: WO2012/102232
PCT Pub. Date: Aug. 2, 2012

(65) Prior Publication Data
US 2013/0307460 A1  Nov. 21, 2013

(30) Foreign Application Priority Data

Jan. 25, 2011 (JP) ................................ 2011-012839
Apr. 7, 2011 (JP) ................................ 2011-085361

(51) Int. Cl.
*H02P 8/00* (2006.01)
*H02P 8/34* (2006.01)
(Continued)

(52) U.S. Cl.
CPC .................. *H02P 8/34* (2013.01); *H02P 8/36* (2013.01); *H02P 8/38* (2013.01); *B41J 19/202* (2013.01)

(58) Field of Classification Search
None
See application file for complete search history.

(56) References Cited

U.S. PATENT DOCUMENTS 4,748,954 A * 6/1988 Igashira .............. F02D 41/2096
   123/300
5,182,507 A * 1/1993 Ishii ........................ H02P 8/36
   318/685

(Continued)

FOREIGN PATENT DOCUMENTS

| JP | 02-184296 | 7/1990 |
| JP | 04-261396 | 9/1992 |
| JP | 2008-029145 | 2/2008 |

OTHER PUBLICATIONS

Japanese Patent Office, International Search Report for PCT/JP2012/051325 (Apr. 10, 2012).

*Primary Examiner* — Shawki S Ismail
*Assistant Examiner* — Zoheb Imtiaz
(74) *Attorney, Agent, or Firm* — Fish & Richardson P.C.

(57) ABSTRACT

A drive circuit of a stepping motor includes a D/A converter, a current controller having a comparing unit, and an abnormality detecting unit. The DAC generates a target voltage indicating a target value for an excitation current determined based on a reference voltage indicating an upper limit value of the excitation current flowing into the stepping motor. The current controller controls the excitation current based on this target voltage. The comparing unit compares a voltage corresponding to the excitation current and the target voltage. The abnormality detecting unit detects an abnormality of the wire between the drive circuit and the stepping motor based on an output signal from the comparing unit and a control signal indicating a polarity of the excitation current.

7 Claims, 16 Drawing Sheets

(51) Int. Cl.
*H02P 8/38* (2006.01)
*H02P 8/36* (2006.01)
*B41J 19/20* (2006.01)

(56) References Cited

U.S. PATENT DOCUMENTS

| | | | | | |
|---|---|---|---|---|---|
| 5,994,790 | A | * | 11/1999 | Nagashima | H02H 3/087 307/10.1 |
| 2007/0252547 | A1 | * | 11/2007 | Kifuku | H02P 23/06 318/432 |
| 2012/0185149 | A1 | * | 7/2012 | Asou | F02D 41/221 701/102 |

* cited by examiner

DRIVE CIRCUIT OF STEPPING MOTOR, INTEGRATED CIRCUIT THEREOF, AND ELECTRONIC EQUIPMENT INCLUDING SAME, AND METHOD FOR CONTROLLING DRIVE CIRCUIT OF STEPPING MOTOR

TECHNICAL FIELD

The present invention relates to a drive circuit of a stepping motor, an integrated circuit integrating the same, and electronic equipment including the same, and a method for controlling the drive circuit of the stepping motor, and more particularly relates to a technology for detecting an abnormality on a path for transmitting an excitation current from the drive circuit to the stepping motor.

BACKGROUND ART

In recent years, a stepping motor achieving smooth rotations without unevenness and thereby being capable of exhibiting low vibration and low noise is often used in electronic equipment such as a printer, a facsimile machine, a scanner, or the like. The stepping motor is generally driven by applying an excitation current to a two-phase excitation coil while allowing the excitation current having phases shifted one another by 90° degrees to be changed into a waveform close to a sine wave (in other words, pseudo sine wave).

Japanese Patent Laying-Open No. 2008-029145 (PTD 1) discloses an example of a drive circuit of a stepping motor. The drive circuit includes a target voltage generating unit for generating a target voltage indicating a target value of an excitation current based on a reference voltage indicating an upper limit of the excitation current, and a current controller for controlling the excitation current based on the target voltage.

CITATION LIST

Patent Document

PTD 1: Japanese Patent Laying-Open No. 2008-029145

SUMMARY OF INVENTION

Technical Problem

In such a driving system of a stepping motor, a drive circuit and a stepping motor are connected to each other by means of a wire. This wire is connected by a connecting unit such as a terminal, a connector, or the like in the drive circuit and the stepping motor. Further, wires may be connected to each other by means of a connector or the like also at an intermediate portion of a wire in some cases.

Since an excitation current cannot be supplied properly from the drive circuit to the excitation coil when loosening of the connecting unit of the wire, a contact failure, or breaking of the wire occurs, the stepping motor cannot be driven.

However, the drive circuit disclosed in Japanese Patent Laying-Open No. 2008-029145 (PTD 1) was not configured to detect such a wire abnormality on the side of the drive circuit.

The present invention was achieved to solve such a problem, and its object is to provide a drive circuit of a stepping motor capable of detecting an abnormality of a wire for supplying an excitation current to a stepping motor.

Solution to Problem

A drive circuit of a stepping motor according to the present invention includes a target voltage generating unit for generating a target voltage indicating a target value as to an excitation current determined based on a reference voltage indicating an upper limit value of the excitation current flowing into the stepping motor, and a current controller for controlling the excitation current so as to maintain a value of the excitation current at the target value based on the target voltage. The current controller includes a comparing unit for comparing a signal corresponding to the excitation current and a predetermined threshold value. The drive circuit further includes an abnormality detecting unit for detecting an abnormality on a path for supplying the excitation current from the drive circuit to the stepping motor based on an output signal from the comparing unit.

Preferably, the comparing unit compares a voltage corresponding to the excitation current and the target voltage as the threshold value. The abnormality detecting unit detects the abnormality based on an output signal from the comparing unit and a control signal indicating a polarity of the excitation current.

Preferably, the stepping motor includes first and second excitation coils. The current controller includes a first channel and a second channel for outputting excitation currents corresponding respectively to the first and second excitation coils. The current controller detects occurrence of the abnormality at a predetermined timing where the control signal for one channel among the first and second channels attains a predetermined state, based on a state of the output signal of the other channel.

Preferably, when the control signal for one channel among the first and second channels is at the predetermined timing, and the output signal indicates that the voltage corresponding to the excitation current for the other channel has not reached the target value of the channel, the current controller detects occurrence of the abnormality.

Preferably, the control signal is a pulse signal. The predetermined timing is determined based on a timing at a falling edge of the control signal.

Preferably, the target voltage generating unit generates the target voltage by dividing the reference voltage in accordance with a ratio of the target value with respect to the upper limit value changing in a stepwise manner from 0 to 1.

Preferably, the drive circuit further includes an instruction generating unit for generating a signal indicating the ratio and the control signal based on information from outside of the drive circuit.

Preferably, the abnormality detecting unit detects the abnormality based on the number of times that a level of a signal corresponding to the excitation current has reached the threshold value within a predetermined period in a state where the excitation current can be provided from the drive circuit to the stepping motor.

Preferably, the threshold value is determined based on the target value. The abnormality detecting unit counts the number based on an output signal from the comparing unit.

Preferably, the abnormality detecting unit detects that the abnormality occurs when the number is less than a predetermined reference number.

Preferably, the threshold value is determined based on a minimum current value being different from the target value and being capable of driving the stepping motor. The abnormality detecting unit counts the number based on an output signal from the comparing unit.

Preferably, the threshold value is set based on a value lower than the target value.

Preferably, the predetermined period is determined based on at least one of an activation signal of the drive circuit, an enable signal for enabling the drive circuit, and a control signal indicating a polarity of the excitation current.

Preferably, the abnormality detecting unit determines the abnormality in response to successive detections of the abnormality for a predetermined times.

Preferably, the abnormality detecting unit outputs an abnormality signal based on determination of the abnormality.

An integrated circuit according to the present invention represents integration of any of the drive circuits described above.

Electronic equipment according to the present invention includes the stepping motor and any of the drive circuits described above.

A method for controlling a drive circuit of a stepping motor according to the present invention includes the steps of generating a target voltage indicating a target value for an excitation current determined based on a reference voltage indicating an upper limit value of the excitation current flowing into the stepping motor, controlling the excitation current so as to maintain a value of the excitation current at the target value based on the target voltage, comparing a signal corresponding to the excitation current and a predetermined threshold value, and detecting an abnormality of a path for supplying the excitation current from the drive circuit to the stepping motor based on an output signal provided by the step of comparing.

Preferably, the step of comparing includes the step of comparing a voltage corresponding to the excitation current and the target voltage as the threshold value. The step of detecting the abnormality includes the step of detecting the abnormality based on the output signal and a control signal indicating a polarity of the excitation current.

Preferably, the method further includes the step of counting the number of times a level of a signal corresponding to the excitation current has reached the threshold value within a predetermined period in a state where the excitation current can be provided from the drive circuit to the stepping motor. The step of detecting the abnormality includes the step of detecting the abnormality based on the number of times.

Advantageous Effects of Invention

According to the present invention, an abnormality of a wire for supplying an excitation current to a stepping motor can be detected in a drive circuit of the stepping motor.

DESCRIPTION OF EMBODIMENTS

Figure 1:
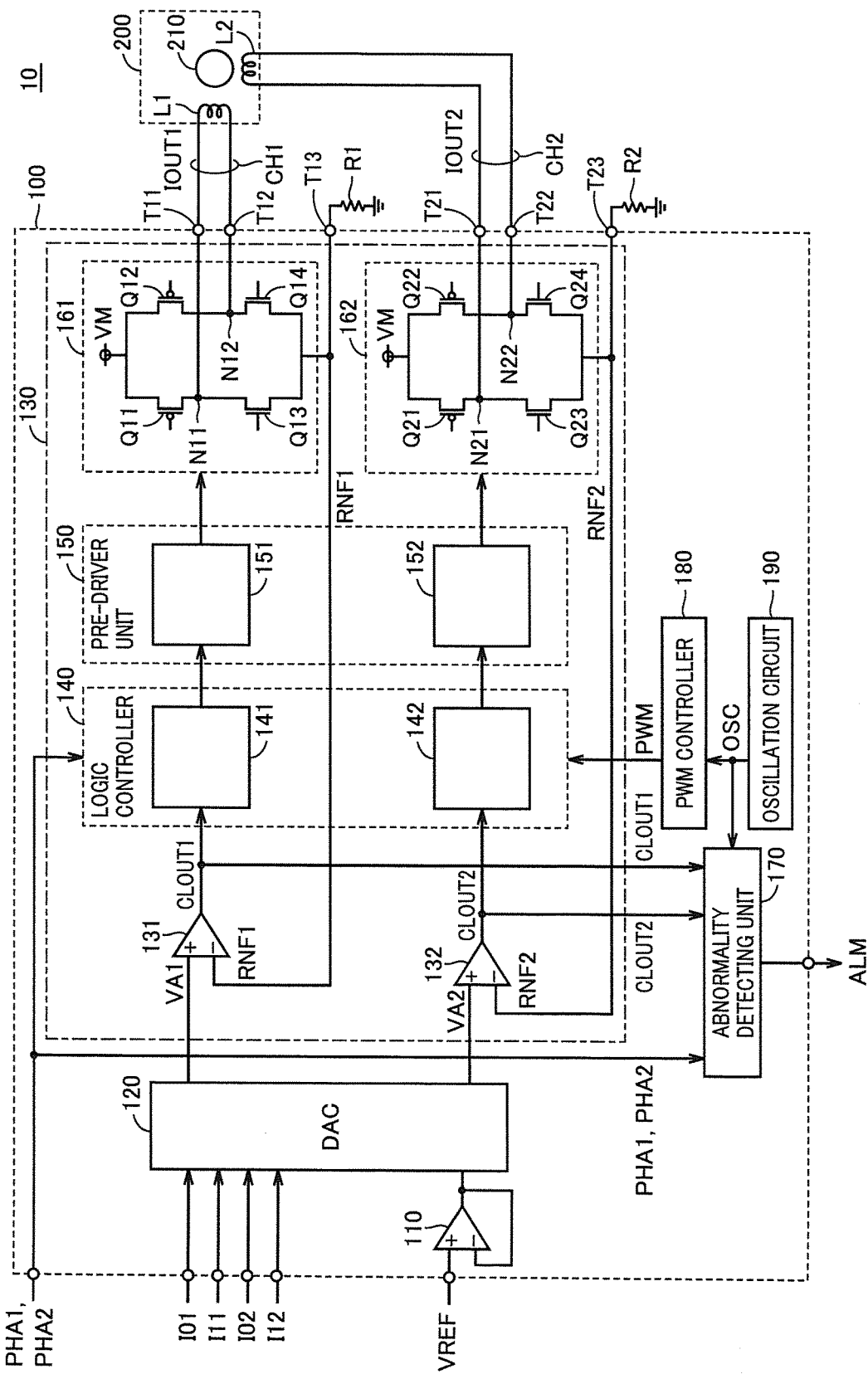
FIG. 1 represents an overall block diagram of a motor driving system including a drive circuit of a stepping motor in accordance with a first embodiment.

In the following, embodiments of the present invention will be described in detail with reference to the drawings. In the drawings, the same or corresponding parts have the same reference signs allotted, and description thereof will not be repeated.

First Embodiment

FIG. 1 represents an overall block diagram of a motor driving system 10 including a drive circuit 100 of a stepping motor in accordance with a first embodiment. This motor driving system 10 is used as a driving unit of electronic equipment such as a printer, a facsimile machine, a scanner, a camera, or the like.

Referring to FIG. 1, stepping motor 200 is a two-phase stepping motor. Stepping motor 200 includes excitation coils L1, L2 corresponding respectively to the two phases and a rotor 210.

Excitation currents IOUT1, IOUT2 flow through excitation coils L1, L2 respectively. Drive circuit 100 controls excitation currents IOUT1, IOUT2 so as to maintain values of excitation currents IOUT1, IOUT2 at set values when stepping motor 200 is driven.

In the present embodiment, drive circuit 100 allows the stepping motor to drive in a micro-step manner. In other words, drive circuit 100 changes a ratio of excitation currents IOUT1, IOUT2 finely to allow rotor 210 of the stepping motor to rotate at a finer step angle than a basic step angle.

Drive circuit 100 includes an input buffer 110, a D/A converter (DAC) 120, a current control circuit 130, an abnormality detecting unit 170, a PWM controller 180, and an oscillation circuit 190.

Current control circuit 130 includes comparators 131, 132, a logic controller 140 having logic circuits 141, 142, a pre-driver unit 150 having pre-drivers 151, 152, and H-bridges 161, 162.

Comparator 131, logic circuit 141, pre-driver 151, and H-bridge 161 constitute a circuit corresponding to a channel CH1 for supplying excitation current IOUT1 to excitation coil L1. Further, comparator 132, logic circuit 142, pre-driver 152, and H-bridge 162 constitute a circuit corresponding to a channel CH2 for supplying excitation current IOUT2 to excitation coil L2. Since the configuration and function of respective circuits corresponding to channels CH1, CH2 are similar, channel CH1 will be described in the following detailed description about the circuit, and similar description as about channel CH2 will not be repeated.

Input buffer 110 is a so-called voltage follower circuit, and directly outputs an inputted reference voltage VREF. Reference voltage VREF is a voltage indicating upper limit values of excitation currents IOUT1, IOUT2.

D/A converter 120 corresponds to a "target voltage generating unit" in the drive circuit of the stepping motor in accordance with the present invention. D/A converter 120 receives reference voltage VREF and control signals I01, I11 and outputs a target voltage VA1 with respect to channel CHL Control signals I01, I11 are signals for changing a ratio of a set value of excitation current IOUT1 with respect to the upper limit value of excitation current IOUT1 within the range of 0 to 1.

Describing in detail, electric potential levels of control signals I01, I11 are switched between an H (High) level and an L (Low) level. Therefore, there are four combinations of electric potential levels of control signals I01, I11. A ratio of the set value of excitation current IOUT1 with respect to the upper limit value of excitation current IOUT1 is changed among four values, for example, 0%, 33%, 67%, and 100%, with respect to the combinations (H, H), (L, H), (H, L), and (L, L) of the electric potential levels of control signals I01, I11. D/A converter 120 generates target voltage VA1 by dividing reference voltage VREF in accordance with the ratio described above.

Current control circuit 130 receives target voltage VA1 and controls excitation current IOUT1 so as to maintain the value of excitation current IOUT1 at the set value.

Comparator 131 compares a voltage RNF1, indicating a current (excitation current IOUT1) flowing through H-bridge 161 and to which the current have been converted by a resistor R1 provided outside of drive circuit 100, and target voltage VA1 to generate an output signal CLOUT1 indicating a result of comparison. Output signal CLOUT1 is, for example, set to be high (Hi) when voltage RNF1 has not reached target voltage VA1, and set to be low (Lo) when voltage RNF1 has reached target voltage VA1.

In the present embodiment, an example of a configuration where resistor R1 is provided outside of drive circuit 100 is described. However, resistor R1 may be included in drive circuit 100.

Logic circuit 141 receives a control signal PHA1 indicating a polarity of excitation current IOUT1 and output signal CLOUT1 of comparator 131. Then, logic circuit 141 generates a drive signal with use of these signals and a control signal PWM set by a PWM controller based on an oscillation signal OSC from oscillation circuit 190.

Pre-driver 151 amplifies a drive signal transmitted from logic circuit 141. A signal transmitted from pre-driver 151 is provided to H-bridge 161. In accordance with operation of H-bridge 161, a magnitude of excitation current IOUT1 supplied to excitation coil L1 is changed.

When the magnitude of excitation current IOUT1 exceeds the upper limit value (in other words, when the output of comparator 131 indicates RNF1>VA1), logic circuit 141 reduces excitation current IOUT1. After an elapse of a predetermined time period from starting the operation of reducing excitation current IOUT1, logic circuit 141 increases excitation current IOUT1. The value of excitation current IOUT1 is controlled so as to maintain the set value by repeating this operation.

H-bridge 161 includes P-type MOS transistors Q11, Q12 and N-type MOS transistors Q13, N14. P-type MOS transistor Q11 and N-type MOS transistor Q13 are connected in series between a power source node receiving a power source electric potential VM of stepping motor 200 and a terminal T13 connected with one end of resistor R1. Similarly, P-type MOS transistor Q12 and N-type MOS transistor Q14 are connected in series between the above-described power source node and terminal T13 connected with one end of resistor R1. The other end of resistor R1 is connected to a ground node.

A node N11 connected with P-type MOS transistor Q11 and N-type MOS transistor Q13 is connected to a terminal T11. Similarly, a node N12 connected with P-type MOS transistor Q12 and N-type MOS transistor Q14 is connected to a terminal T12. Two terminals of excitation coil L1 are connected respectively to terminals T11, T12 via wires.

In the above, an example of the configuration of using the H-bridge formed by the P-type MOS transistors and the N-type transistors is described. However, the configuration of all of the transistors forming the H-bridge may be N-type MOS transistors. As described above, when the H-bridge is formed with use of transistors all of which are N-type MOS transistors, a separate booster circuit for driving the transistors is required, as compared to the case of using the P-type MOS transistors and the N-type transistors. However, since the N-type MOS transistor is more likely to be reduced in a circuit area than the P-type MOS transistor, for example, when an output current of the P-type MOS transistor is high, using the N-type MOS transistor for all the transistors even with the booster circuit may have an advantage that an overall area of the circuit can be reduced more. On the other hand, when the P-type MOS transistor and the N-type MOS transistor are used as can be seen in the example described above, the booster circuit is not required. Therefore, the type of the transistors forming the H-bridge is appropriately selected taking in consideration the factors such as a current flowing through the circuit, a circuit area, and the like.

Abnormality detecting unit 170 receives control signals PHA1, PHA2 respectively indicating polarities of excitation currents IOUT1, IOUT2, output signals CLOUT1, CLOUT2 of comparators 131, 132, and oscillation signal OSC from oscillation circuit 190. Abnormality detecting unit 170 executes an abnormality detection control for detecting whether or not an abnormality occurs in the wire for supplying excitation currents IOUT1, IOUT2 from drive circuit 100 to stepping motor 200, based on these information.

Figure 2:
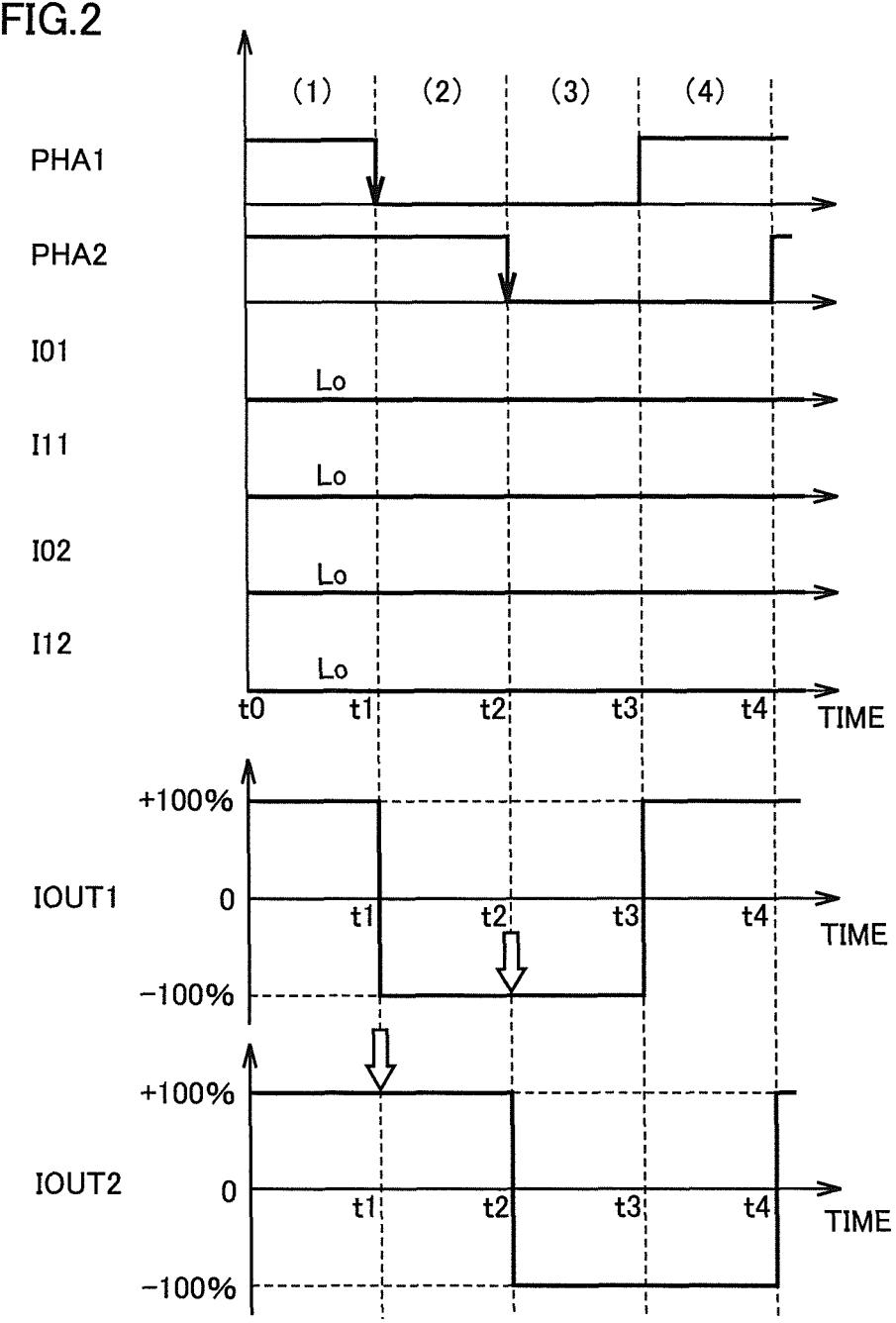
FIG. 2 represents an example of a time chart for describing an abnormality detection control in the case of a full-step mode.
Figure 3:
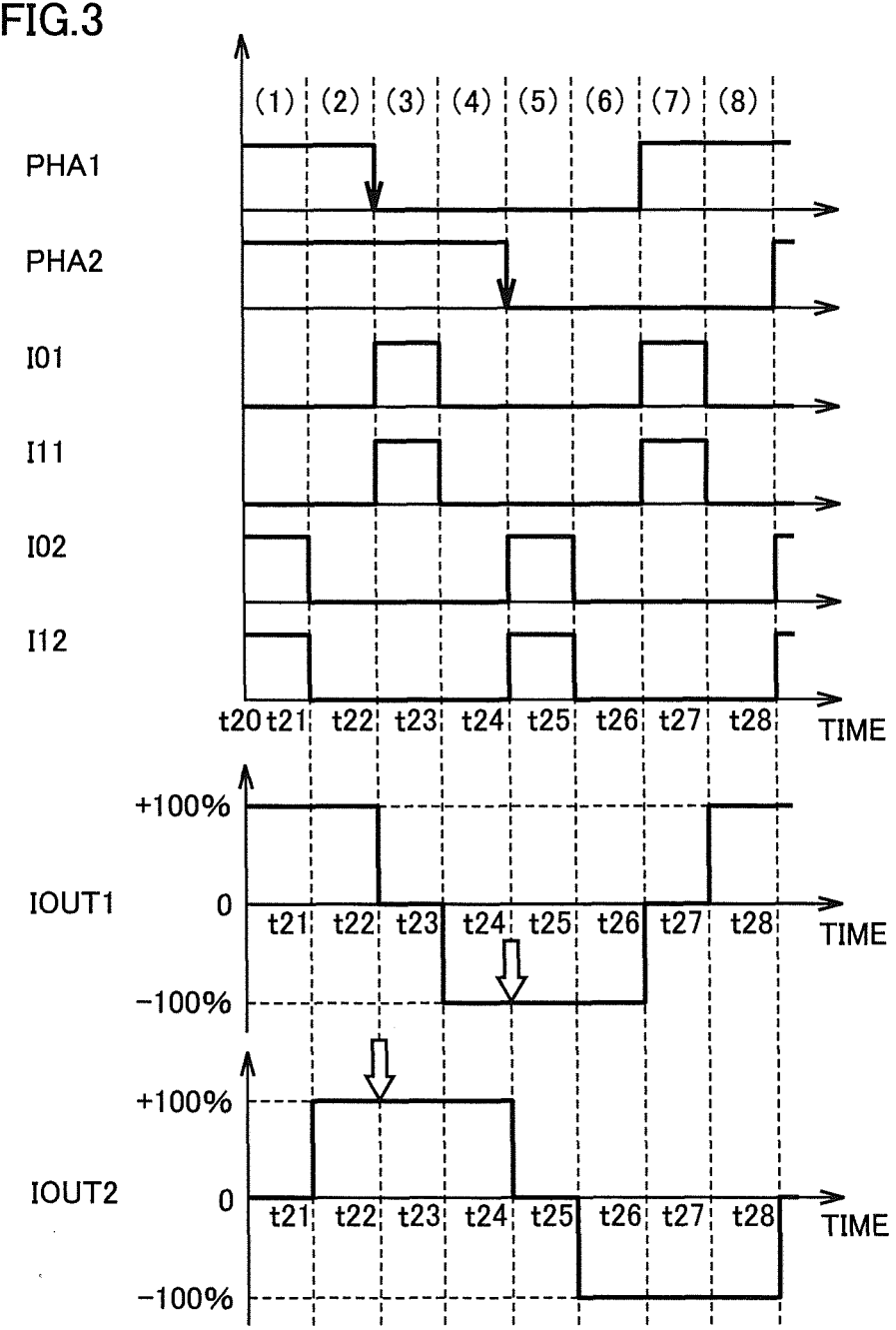
FIG. 3 represents an example of a time chart for describing an abnormality detection control in the case of a half-step mode.

Next, with reference to FIGS. 2 and 3, an outline of the abnormality detection control executed by abnormality detecting unit 170 will be described. FIG. 2 represents an example of a time chart in the case of a full-step mode. FIG. 3 represents an example of a time chart in the case of a half-step mode. In both FIGS. 2 and 3, the horizontal axis denotes a time, and the vertical axis denotes states of control signals PHA1, PHA2 indicating polarities of the excitation current, states of control signals I01, I11, I02, I12 determining a voltage division ratio of the target voltage, and states of excitation currents IOUT1, IOUT2.

Referring to FIGS. 1 and 2, in the case of this full-step mode, control signals I01, I11, I02, I12 are always set at a low level (Lo), and excitation currents IOUT1, IOUT2 are synchronized respectively with control signals PHA1, PHA2 to switch in a rectangular wave form between the state of +100% and the state of −100%.

Particularly, as to excitation current IOUT1, falling of control signal PHA1 from the high level to the low level at time t1 causes excitation current IOUT1 to switch from +100% to −100%, and rising of control signal PHA1 from the low level to the high level at time t3 causes excitation current IOUT1 to switch from −100% to +100%.

As to excitation current IOUT2, there is a phase difference of 90° with excitation current IOUT1 as described above. Therefore, excitation current IOUT2 switches from +100% to −100% at time t2, and excitation current IOUT2 switches from −100% to +100% at time t4.

As can be understood from FIG. 2, at the timings (times t1, t3) where the polarity of excitation current IOUT1 of channel CH1 change, the polarity of excitation current IOUT2 of channel CH2 is stably maintained.

In this stage, when the wire of channel CH2 is normal, excitation current IOUT2 has reached a target voltage VA2. Therefore, output signal CLOUT2 of comparator 132 is in the state of Lo. On the other hand, when an abnormality such as breaking of wire occurs in the wire of channel CH2, and excitation current IOUT2 does not flow properly, output signal CLOUT2 of comparator 132 is in the state of Hi.

Therefore, at the timing where the polarity of the excitation current is switched in one channel, the state of the output signal of the comparator in the other channel is detected, so that whether or not an abnormality occurs in the wire on the other side can be determined.

The timing for detecting the state of the output signal of the comparator may be in any of the cases of a rising or falling edge of control signals PHA1, PHA2. Alternatively, the timing for detecting the state of the output signal of the comparator may be the timing after an elapse of a predetermined delayed time from a rising or falling edge of control signals PHA1, PHA2.

Next, the case of the half-step mode will be described with reference to FIG. 3. In the half-step mode, the states of each of control signals I01, I11, I02, I12 is controlled for only the time period in one-half of the ¼ cycle (in other words, ⅛ cycle) during which the combination states of the polarities of excitation currents IOUT1, IOUT2 are changed.

Particularly, in the case of FIG. 3, control signals I01, I11 are in the state of Hi only from time t22 to time t23 and from time t26 to time t27 in FIG. 3. On the other hand, control signals I02, I12 are in the state of Hi only from time t20 to time t21 and from time t24 to time t25 in FIG. 3. In such a manner described above, as shown in FIG. 3, when control signals I01, I11 are in the state of Hi, excitation current IOUT1 is in the state of 0%, and when control signals I02, I12 are in the state of Hi, excitation current IOUT2 is in the state of 0%. Therefore, the waveforms of excitation currents IOUT1, IOUT2 can be made close to the wave form of a sine wave.

Also in this case, similarly to the case of FIG. 2, at the timing where the polarity of the excitation current is switched (for example, at times t22, t24), the current state of the channel on the other side is detected, so that whether or not an abnormality occurs in the wire of the channel on the other side can be determined.

Figure 4:
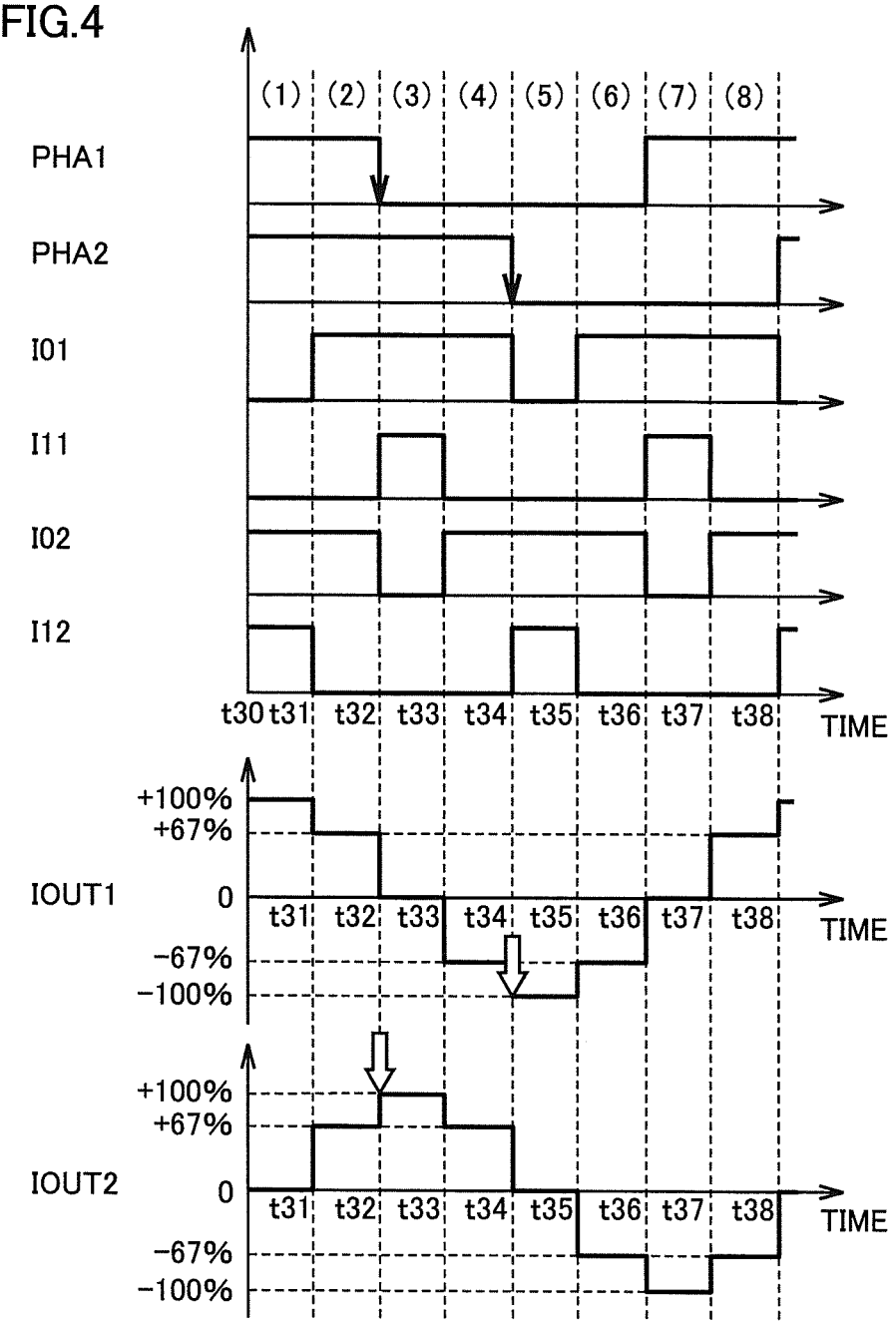
FIG. 4 represents another example of a time chart for describing an abnormality detection control in the case of the half-step mode.

In the case of the half-step mode, different waveforms of the excitation current can be achieved by the combinations of control signals I01, I11, I02, I12. For example, FIG. 4 represents an example of the case having control signals I01, I02 set to be Lo only for ⅛ cycle and control signals I11, I12 set to be Hi only for ⅛ cycle. In this case, the level of the excitation current can be in the intermediate state of +67% and −67% from time t31 to t32, from time t33 to time t34, from time t35 to time t36, and from time t37 to time t38 in FIG. 4, so that the excitation current can be closer to the sine wave.

In the case of FIG. 4, the timings where control signals PHA1, PHA2 switch correspond to the timings where the level of the excitation current changes to +100% (or to −100%). Therefore, the state of charging with respect to the excitation coil is detected, so that there is a possibility that an abnormality cannot be detected appropriately. In such a case, as described above, it is preferable to detect a state after an elapse of a predetermined time period from the timing of switching control signals PHA1, PHA2.

Further, although not illustrated in the drawings, in the case of the quarter step mode of controlling the states of control signals I01, I11, I02, I12 during yet ¼ of the ¼ cycle (in other words, 1/16 cycle) where the combination states of the polarity of excitation currents IOUT1, IOUT2 is changed, the level of the excitation current can be set to the state of +33% or −33% by the combinations of control signals I01, I11, I02, I12. Accordingly, the waveform of the excitation current can be yet closer to the sine wave, so that smoother rotation can be achieved.

Also in the case of this quarter step mode, the current state of the channel on the other side is detected at an appropriate timing based on the timing of switching control signals PHA1, PHA2, so that whether or not an abnormality occurs in the wire of the cannel on the other side can be determined.

Figure 5:
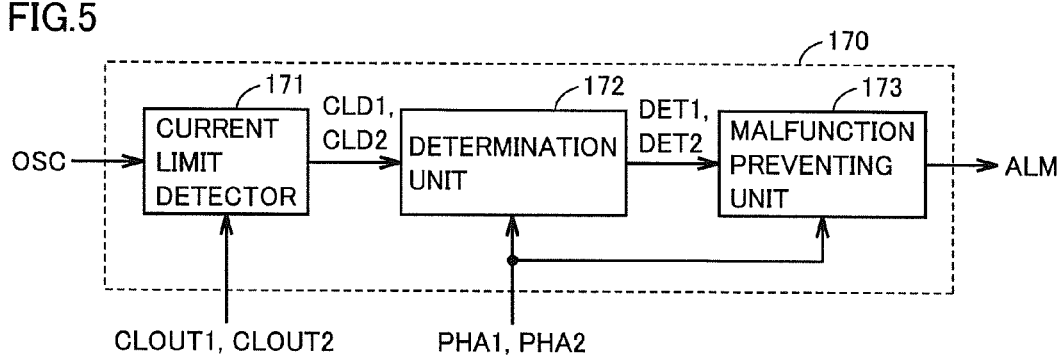
FIG. 5 represents a functional block diagram for describing an abnormality detection control executed by an abnormality detecting unit in the first embodiment.

FIG. 5 represents a functional block diagram for describing the abnormality detection control executed by abnormality detecting unit 170 in the first embodiment. Each functional block shown in the functional block diagram of FIG. 5 is achieved by hardware or software processing executed by abnormality detecting unit 170.

Referring to FIGS. 1 and 5, abnormality detecting unit 170 includes a current limit detector 171, a determination unit 172, and a malfunction preventing unit 173.

Current limit detector 171 receives oscillation signal OSC from oscillation circuit 190, and output signals CLOUT1, CLOUT2 from comparators 131, 132. For each of output signals CLOUT1, CLOUT2, during a predetermined period (T1) determined by oscillation signal OSC, current limit detector 171 determines whether or not output signals CLOUT1, CLOUT2 become Lo, in other words, whether or not excitation currents IOUT1, IOUT2 have reached current limit values corresponding to target voltages VA1, VA2 after output signals CLOUT1, CLOUT2 have reached target voltages VA1, VA2 respectively.

When output signals CLOUT1, CLOUT2 become Lo during the predetermined period described above, current limit detector 171 sets corresponding detection signals CLD1, CLD2 to be OFF. On the other hand, when output signals CLOUT1, CLOUT2 remain Hi during the predetermined period described above, detection signals CLD1, CLD2 are set to be ON. Then, current limit detector 171 outputs detection signals CLD1, CLD2 to determination unit 172.

Determination unit 172 receives detection signals CLD1, CLD2 from current limit detector 171, and control signals PHA1, PHA2. As described above with reference to FIGS. 2 to 4, determination unit 172 determines whether or not detection signals CLD1, CLD2 of the other channel are set to be ON at a predetermined timing determined based on rising and falling edges of control signals PHA1, PHA2.

When detection signals CLD1, CLD2 on the side of the other channel are set to be ON at the predetermined timing described above, determination unit 172 sets abnormality flags DET1, DET2 of the corresponding channel to be ON as exhibiting possibility of occurrence of an abnormality in the wire of the channel on the other side. When detection signals CLD1, CLD2 are OFF, abnormality flags DET1, DET2 are set to be OFF.

Then, determination unit 172 outputs abnormality flags DET1, DET2 to malfunction preventing unit 173.

Malfunction preventing unit 173 exhibits a function for preventing an effect of erroneous detection in the case where, for example, determination unit 172 temporarily has determined an abnormality due to delays in rising of the excitation current or effect of noises by operation state of stepping motor 200 even though no abnormality is present in the wire.

Malfunction preventing unit 173 receives abnormality flags DET1, DET2 from determination unit 172 and control signals PHA1, PHA2. Malfunction preventing unit 173 determines whether or not abnormality flags DET1, DET2 are set to be ON successively by determination unit 172 at cycles of successive predetermined numbers of times (for example, 3 times) of control signals PHA1, PHA2. Then, when it is detected that abnormality flags DET1, DET2 are set to be ON successively for a predetermined times, malfunction preventing unit 173 settles occurrence of an abnormality in the wire and outputs an abnormality signal ALM in response. This abnormality signal ALM is received by an abnormality notifying unit (not illustrated) provided outside or inside of drive circuit 100, so that occurrence of an abnormality is notified to a user.

Figure 6:
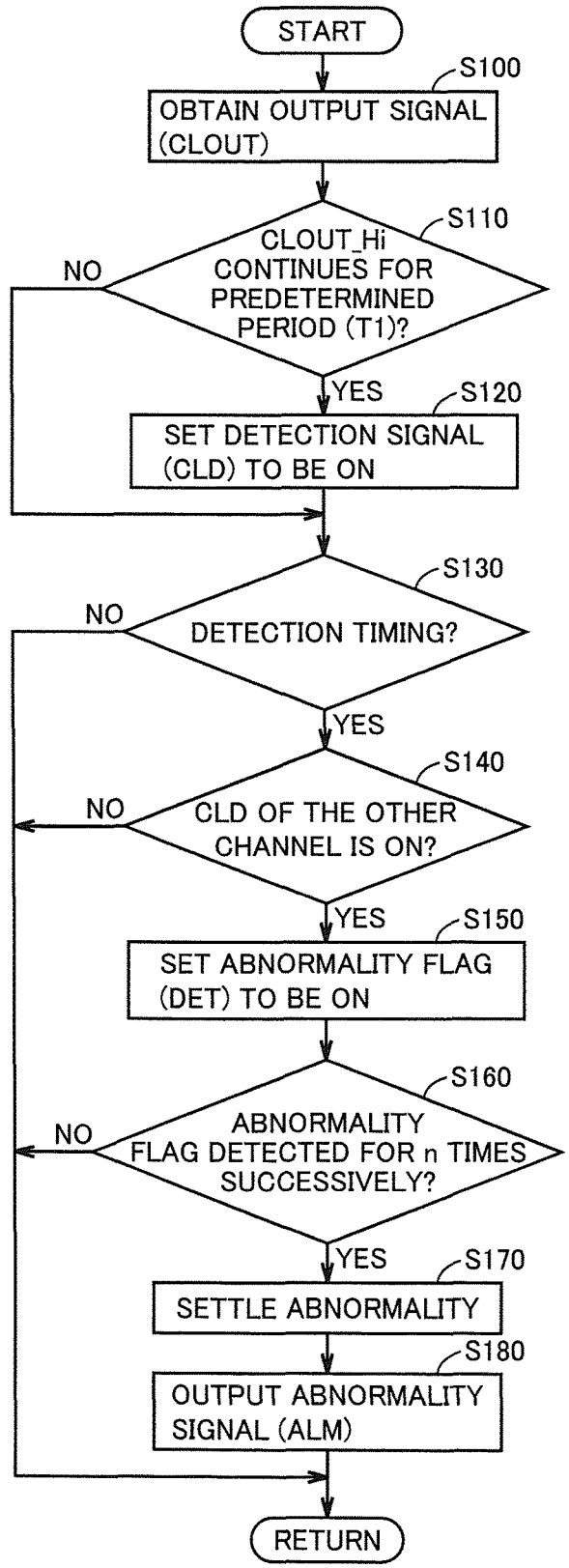
FIG. 6 represents a flowchart for describing details of an abnormality detection control processing executed by the abnormality detecting unit in the first embodiment.

FIG. 6 is a flowchart for describing details of the abnormality detection control processing executed by abnormality detecting unit 170 in the first embodiment. As to the flowchart shown in FIG. 6, when the processing is executed by a programmable CPU (not illustrated) provided in abnormality detecting unit 170, a program stored in advance in the CPU is invoked from a main routine and executed at predetermined cycles to thereby achieve the processing. Alternatively, as to a part of or all of the steps, the processing can be achieved by dedicated hardware (electronic circuit).

Referring to FIGS. 1 and 6, abnormality detecting unit 170 obtains, in Step (in the following, the term "step" will be abbreviated as "S") 100, output signals CLOUT1, CLOUT2 (in the following, CLOUT1 and CLOUT2 will be collectively referred to as "CLOUT") from comparators 131, 132. Then, in S110, abnormality detecting unit 170 determines whether or not these output signals maintains the state of Hi during a predetermined time period T1.

When output signal CLOUT maintains the state of Hi during predetermined time period T1 (YES in S110), abnormality detecting unit 170, in S120, sets a detection signal CLD (in the following, CLD1 and CLD2 will be collectively referred to as "CLD") of a corresponding channel to be ON. After that, the processing proceeds to S130.

When output signal CLOUT attains the state of Lo during predetermined time period T1 (NO in S110), S120 is skipped, and the processing proceeds to S130.

In S130, abnormality detecting unit 170 determines whether or not the timing is at a predetermined detection timing based on a control signal PHA (in the following, PHA1 and PHA2 will be collectively referred to as "PHA").

When the timing is not at the predetermined detection timing (NO in S130), abnormality detecting unit 170 terminates the processing.

When the timing is at the predetermined detection timing (YES in S130), the processing proceeds to S140, and abnormality detecting unit 170 subsequently determines whether or not detection signal CLD of the other channel is set to be ON.

When detection signal CLD is not set to be ON (NO in S140), abnormality detecting unit 170 determines that the excitation current meets the target value and no abnormality occurs in the wire, and then terminates the processing.

On the other hand, when detection signal CLD is set to be ON (YES in S140), the processing proceeds to S150, and abnormality detecting unit 170 sets abnormality flag DET (in the following, DET1 and DET2 will be collectively referred to as "DET") of the corresponding channel to be ON, assuming that there is a possibility of occurrence of a wire abnormality.

Then, abnormality detecting unit 170 determines, in S160, whether or not this abnormality flag DET is detected successively for a predetermined number of times (n times: n is a natural number) of cycles of control signal PHA.

When control signal PHA is not detected successively for "n" times (NO in S160), abnormality detecting unit 170 determines that the abnormal state was erroneously detected, and then terminates the processing.

When control signal PHA is detected successively for "n" times (YES in S160), the processing proceeds to S170, and abnormality detecting unit 170 determines that a wire abnormality occurs. Then, abnormality detecting unit 170 outputs abnormality signal ALM in S180.

With the control performed in accordance with such processing, an abnormality in the wire for supplying the excitation current to the stepping motor can be detected in the drive circuit of the stepping motor.

Second Embodiment

As to drive circuit 100 of the stepping motor in accordance with the first embodiment, the configuration of providing control signals PHA1, PHA2 and control signals I01, I11, I02, I12 from outside of drive circuit 100 is described. However, these control signals may be generated in the drive circuit.

In the second embodiment, a drive circuit of a stepping motor having a function of generating the above-described control signals inside based on information such as a control mode or the like provided from outside will be described.

Figure 7:
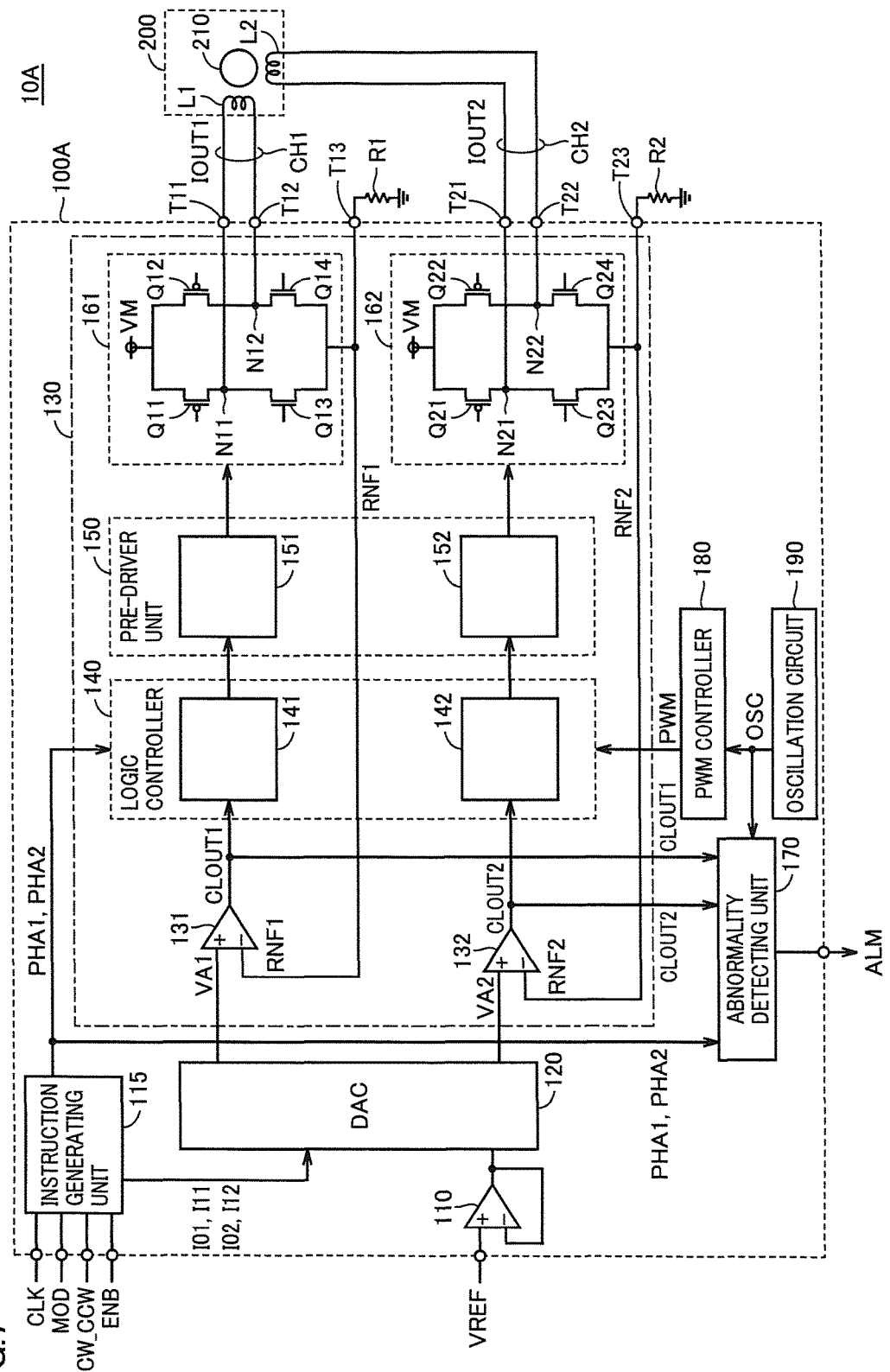
FIG. 7 represents an overall block diagram of a motor driving system including a drive circuit of a stepping motor in accordance with a second embodiment.

FIG. 7 represents an overall block diagram of a motor driving system 10A including a drive circuit 100A of the stepping motor in accordance with the second embodiment. FIG. 7 shows the configuration with an instruction generating unit 115 added to drive circuit 100 described with reference to FIG. 1 of the first embodiment. In FIG. 7, description as to the elements overlapping with FIG. 1 will not be repeated.

Referring to FIG. 7, drive circuit 100A further includes instruction generating unit 115 in addition to the configuration of drive circuit 100 shown in FIG. 1.

Instruction generating unit 115 receives from outside of the circuit a reference clock signal CLK, a control mode signal MOD, a signal CW_CCW indicating a direction of rotation, and an enable signal ENB. Control mode signal MOD is a signal determining which of the full-step mode, the half-step mode, and the quarter-step mode described with reference to FIGS. 2 to 4 of the first embodiment is to be selected.

Instruction generating unit 115 generates control signals PHA1, PHA2 based on the information and outputs the control signals to logic controller 140 and abnormality detecting unit 170. Further, instruction generating unit 115 generates control signals I01, I11, I02, I12 and outputs the signals to D/A converter 120.

When these control signals are used only in the drive circuit, the configuration of providing the instruction generating unit inside the drive circuit as shown in FIG. 7 eliminates the necessity of providing additional circuit having a function corresponding to the instruction generating unit outside of the drive circuit. Therefore, there is an advantage that it can be applied for more applications.

Third Embodiment

In the first embodiment and the second embodiment, the description was made on the configuration of detecting an abnormality in a current transmission path from the drive circuit to the stepping motor by determining whether or not the target excitation current flows at the predetermined timing.

In the third to fifth embodiments described in the following, description will be made on the configuration of detecting an abnormality of the current transmission path based on the number of times that the excitation current has reached a current limit during the chopping operation performed in the current control of the excitation current.

Figure 8:
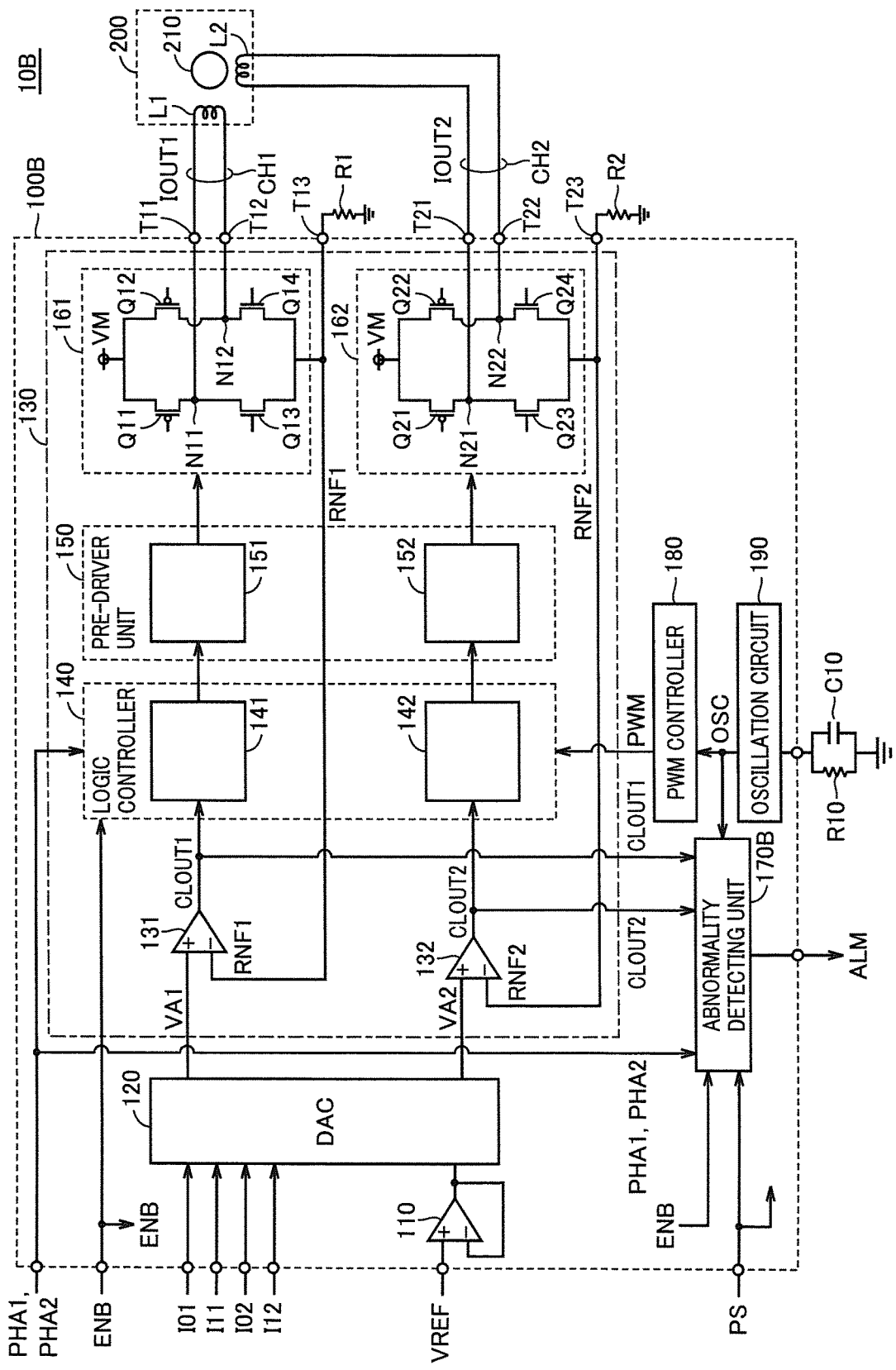
FIG. 8 represents an overall block diagram of a motor diving system including a drive circuit of a stepping motor in accordance with a third embodiment.

FIG. 8 represents an overall block diagram of a motor driving system 10B including a drive circuit 100B of a stepping motor in accordance with the third embodiment. In FIG. 8, abnormality detecting unit 170 shown in FIG. 1 of the first embodiment is replaced with an abnormality detecting unit 170B. Further, a resistor R10 and a capacitor C10 provided outside of the drive circuit and connected in series are connected to oscillation circuit 190.

In FIG. 8, description of the elements overlapping with FIG. 1 will not be repeated. Further, similarly to the first embodiment, since the configuration and function of the circuits corresponding respectively to channels CH1, CH2 are similar, only channel CH1 will be described in the following description, and the description as to channel CH2 will not be repeated.

Referring to FIG. 8, drive circuit 100B receives a power-saving signal PS as an activation signal from outside. In response to a power-saving signal PS turned ON (high level), drive circuit 100B attains an operable state with supply of power to each circuit provided in drive circuit 100B. On the other hand, when power-saving signal PS is turned OFF (low level), drive circuit 100B attains a stand-by state, and an output of the excitation current to stepping motor 200 is stopped.

Logic circuit 141 of channel CH1 receives a phase signal PHA1 indicating a polarity of excitation current IOUT1, output signal CLOUT1 of comparator 131, and enable signal ENB. Then, logic circuit 141 generates a drive signal with use of these signals and a control signal PWM set by the PWM controller in accordance with oscillation signal OSC from oscillation circuit 190.

Enable signal ENB is a signal for enabling logic controller 140 (logic circuits 141, 142). Turning enable signal ENB ON (high level) allows logic controller 140 to be enabled. Driving transistors included in H-bridges 161, 162 allow the excitation current to be supplied from drive circuit 100B to stepping motor 200. On the other hand, turning enable signal ENB OFF (low level) allows logic controller 140 to be disabled, and the supply of the excitation circuit from drive circuit 100B to stepping motor 200 is stopped.

Resistor R10 and capacitor C10 connected in parallel are connected to oscillation circuit 190. The parallel circuit of resistor R10 and capacitor C10 determines a cycle of the chopping operation described later with reference to FIG. 10.

Abnormality detecting unit 170B receives phase signals PHA1, PHA2 respectively indicating polarities of excitation currents IOUT1, IOUT2, output signals CLOUT1, CLOUT2 of comparators 131, 132, oscillation signal OSC from oscillation circuit 190, enable signal ENB, and power-saving signal PS. Abnormality detecting unit 170B executes an abnormality detection control for detecting whether or not an abnormality occurs in the wire for supplying excitation currents IOUT1, IOUT2 from drive circuit 100B to stepping motor 200 based on these information.

Figure 9:
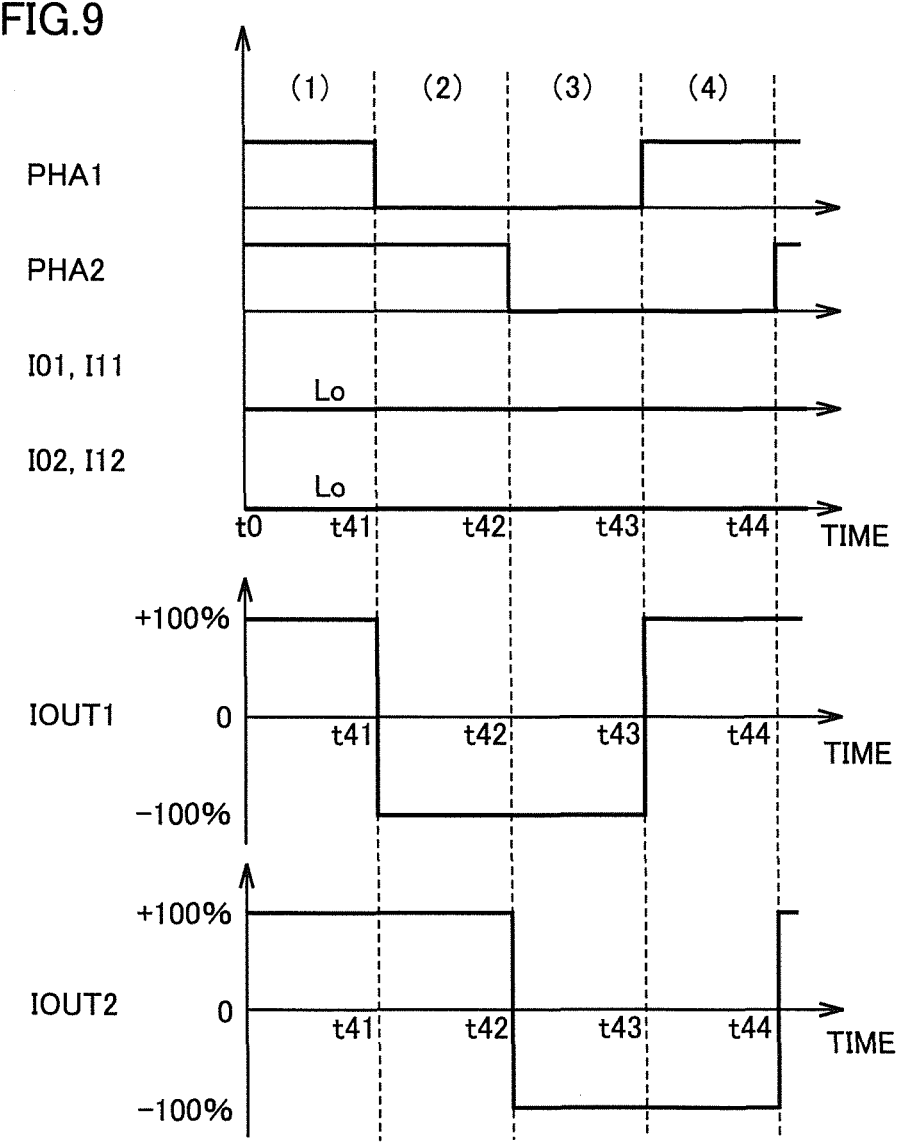
FIG. 9 represents a first time chart for describing an abnormality detection control in the third embodiment.

Next, with reference to FIGS. 9 and 10, an outline of the abnormality detection control executed by abnormality detecting unit 170B will be described. FIG. 9 represents a time chart showing a general output current in the case of the full-step mode as an example. The horizontal axis denotes time, and the vertical axis denotes the states of phase signals PHA1, PHA2 indicating polarities of the excitation currents, the states of control signals I01, I11, I02, I12 determining a voltage division ratio of the target voltage, and the states of excitation currents IOUT1, IOUT2. In the following, the case of the full-step mode will be described as an example. However, the following control can be applied also in the half-step mode of controlling the state of each control signal I01, I11, I02, I12 for a time which is one-half of the ¼ cycle (in other words, ⅛ cycle) where the combination state of the polarities of excitation currents IOUT1, IOUT2 is changed, or in the quarter-step mode of controlling the state of each control signal I01, I11, I02, I12 for a time which is yet ¼ of the ¼ cycle (in other words, 1/16 cycle) where the combination state of the polarities of excitation currents IOUT1, IOUT2 is changed.

Referring to FIG. 9, in the case of the full-step mode, control signals I01, I11, I02, I12 are always maintained at the low level (Lo), and excitation currents IOUT1, IOUT2 are synchronized respectively with phase signals PHA1, PHA2 and switched in a rectangular waveform between the state of +100% and the state of −100%.

Particularly, as to excitation current IOUT1, a falling edge of phase signal PHA1 from the high level to the low level at time t41 causes excitation current IOUT1 to be switched from +100% to −100%, and a rising edge of phase signal PHA1 from the low level to the high level at time t43 causes excitation current IOUT1 to be switched from −100% to +100%.

As to excitation current IOUT2, there is a phase difference of 90° with excitation current IOUT1 as described above. Therefore, excitation current IOUT2 switches from +100% to −100% at time t42, and excitation current IOUT2 switches from −100% to +100%.

In the half-step mode and the quarter-step mode, the excitation current of the intermediate level is used to supply an excitation current closer to the sine wave than the full-step mode of FIG. 9.

Figure 10:
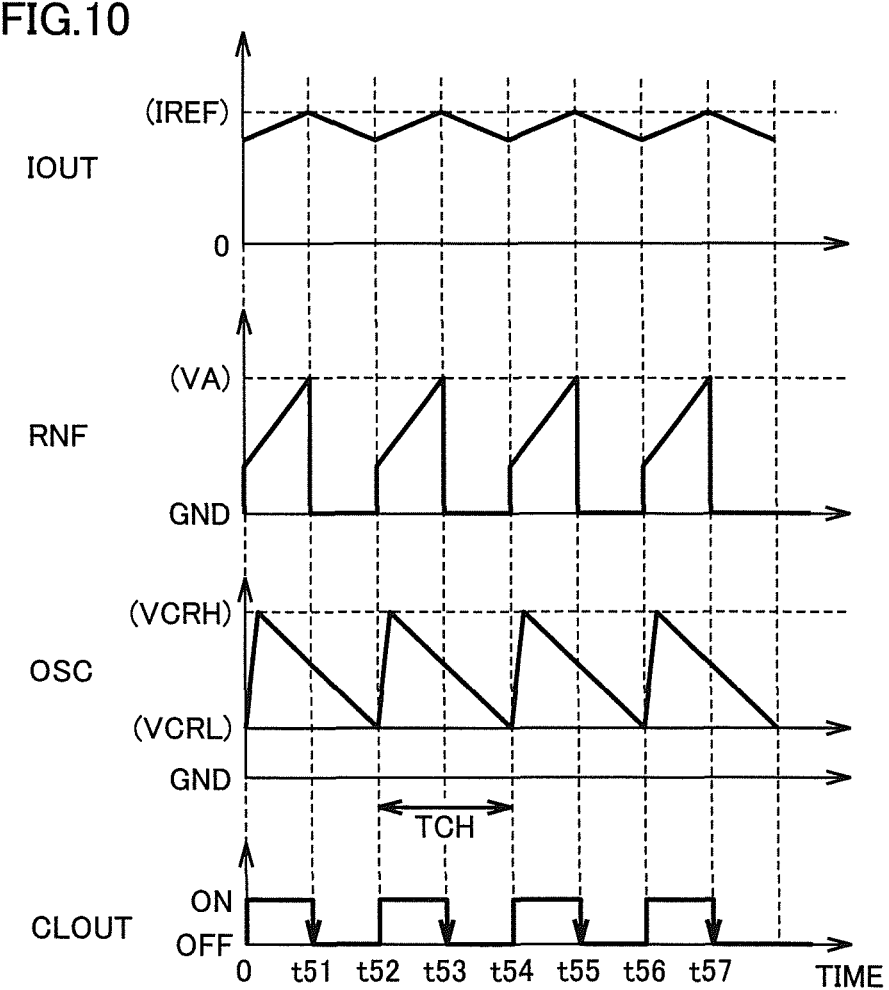
FIG. 10 represents a second time chart for describing an abnormality detection control in the third embodiment.

FIG. 10 is a drawing for describing more in detail the state of excitation current IOUT1 from time 0 to time t41 in FIG. 9. In FIG. 10, the horizontal axis denotes time, and the vertical axis denotes excitation current IOUT, voltage RNF indicating excitation current IOUT, oscillation signal OSC, and output signal CLOUT. In the following description, each signal of channels CH1, CH2 will be collectively referred. For example, IOUT1 and IOUT2 are collectively referred to as "IOUT" or the like.

Referring to FIGS. 8 and 10, in current control circuit 130, each channel is controlled using the feedback loop shown in FIG. 8 so that output current IOUT reaches target current IREF.

Oscillation signal OSC is changed to have a triangular wave form between an electric potential VCRH and an electric potential VCRL by the parallel circuit of resistor R10 and capacitor C10 shown in FIG. 8. More particularly, when oscillation signal OSC attains electric potential VCRL, capacitor C10 of the parallel circuit is charged, so that oscillation signal OSC increases to electric potential VCRH. When oscillation signal OSC reaches electric potential VCRH, charging of capacitor C10 is stopped, so that electric load stored in capacitor C10 is discharged by resistor R10. When the electric potential of oscillation signal OSC is lowered to electric potential VCRL by this discharging, capacitor C10 is charged again.

As described above, resistor R10 and capacitor C10 of the parallel circuit determines a chopping cycle TCH of current control circuit 130.

At the rising edge of oscillation signal OSC (time 0, t52, t54, t56 in FIG. 10), output signal CLOUT is turned ON, and logic controller 140 and pre-driver unit 150 allows driving of the transistors of the H-bridges to start, so that excitation current IOUT increases. This causes voltage RNF to increase.

When voltage RNF has not reached target voltage VA, output signal CLOUT remains in the ON state, and supply of excitation current IOUT is continued. Then, when voltage RNF has reached target voltage VA, in other words, when output current IOUT has reached target current IREF, output signal CLOUT from the comparator is turned OFF (time t51, t53, t55, t57).

Accordingly, driving of the H-bridge is stopped by logic controller 140. This causes the current not to flow through resistors R1, R2, so that voltage RNF is lowered to the ground potential. Then, after oscillation signal OSC has been lowered to electric potential VCRL, and oscillation signal OSC rises again, output signal CLOUT is turned ON, and the H-bridge is driven, so that output current IOUT increases.

In current control circuit 130, the value of target current IREF is changed by phase signal PHA indicating the polarity of excitation current IOUT and control signals I01, I02, I11, I12 in the state where power-saving signal PS and enable signal ENB are in the ON state. However, the chopping operation as described above is always repeated at short chopping cycle TCH, so that output current IOUT is controlled to attain predetermined target current IREF.

As can be understood from FIG. 10, in the case where the path for supplying the excitation current from drive circuit 100B to stepping motor 200 is normal, when voltage RNF reaches target voltage VA, in other words, excitation current IOUT reaches target current IREF as a current limit in each chopping cycle TCH, output signal CLOUT is changed from ON to OFF. However, in the case where the path for supplying the excitation current is broken, excitation current IOUT does not reach the current limit, so that the ON state of output signal CLOUT is maintained.

Therefore, in the third embodiment, an abnormality of the path for supplying the excitation current is detected by detecting whether or not excitation current IOUT has reached the current limit, in other words, whether or not output signal CLOUT has been changed from ON to OFF.

Figure 11:
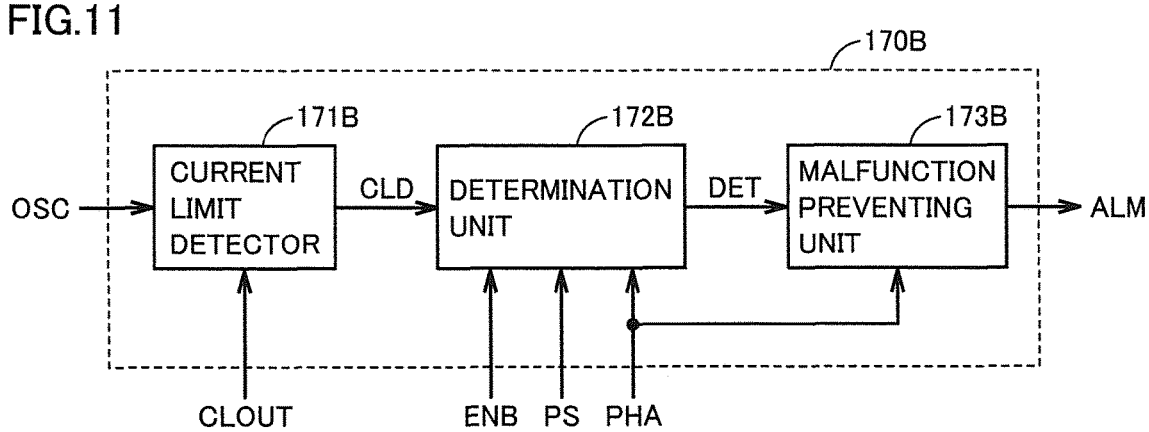
FIG. 11 represents a functional block diagram for describing an abnormality detection control executed by an abnormality detecting unit in the third embodiment.

FIG. 11 represents a functional block diagram for describing the abnormality detection control executed by abnormality detecting unit 170B in the third embodiment. Each functional block shown in the functional block diagram of FIG. 11 is achieved by hardware or software processing executed by abnormality detecting unit 170B.

Referring to FIGS. 8 and 11, abnormality detecting unit 170B includes a current limit detector 171B, a determination unit 172B, and a malfunction preventing unit 173B.

Current limit detector 171B receives oscillation signal OSC from oscillation circuit 190 and output signal CLOUT from the comparator. As to output signal CLOUT, current limit detector 171B determines whether or not output signal CLOUT has been changed from ON to OFF, in other words, whether output signal CLOUT has reached target voltage VA and excitation current IOUT has reached the current limit value corresponding to target voltage VA during each chopping cycle described with reference to FIG. 10.

When output signal CLOUT is changed from ON to OFF during the predetermined period, current limit detector 171B sets detection signal CLD to be OFF. On the other hand, when output signal CLOUT remains being ON during the predetermined period, detection signal CLD is set to be ON. Then, current limit detector 171B outputs detection signal CLD to determination unit 172B.

Determination unit 172B receives detection signal CLD from current limit detector 171B, phase signal PHA, enable signal ENB, and power-saving signal PS. For example, determination unit 172B counts the number of the OFF states of detection signal CLD during a predetermined period with constant target current IREF determined based on a rising or falling edge of phase signal PHA.

When the number of OFF state of detection signal CLD does not reach a predetermined number of times during the predetermined period, determination unit 172B assumes that there is a possibility of occurrence of abnormality in the wire of the channel and sets abnormality flag DET of the corresponding channel to be ON. When the number of OFF states of detection signal CLD is more than the predetermined times, the wire is determined as being normal, and abnormality flag DET is set to be OFF. Then, determination unit 172B outputs abnormality flag DET to malfunction preventing unit 173B.

Switching of the PHA signal is performed only when stepping motor 200 is actually driven (rotated). Therefore, when the determination is made based only on the timing of switching of phase signal PHA, an abnormality in the wire cannot be determined in the state where stepping motor 200 is stopped. Consequently, it is preferable to make determination of the abnormality of the wire also during the period determined based on the timing of the ON state of power-saving signal PS and the ON state of enable signal ENB, in other words, the timing at which the excitation current is supplied from drive circuit 100B to stepping motor 200, in addition to the timing of switching phase signal PHA. Further, when the switching of the PHA signal is not performed for a certain period, determination of the abnormality may be performed at predetermined time intervals.

This allows determination of an abnormality in the wire in the state where stepping motor 200 is initially driven after turning on the power source or in the state where the stopped state of stepping motor 200 is maintained.

Malfunction preventing unit 173B exhibits a function for preventing an effect of erroneous detection in the case where, for example, determination unit 172B temporarily determines an abnormality due to delays in rising of the excitation current or effect of noises by operation state of stepping motor 200 even though no abnormality is present in the wire.

Malfunction preventing unit 173B receives abnormality flag DET from determination unit 172B, and phase signal PHA. Malfunction preventing unit 173B determines whether or not abnormality flag DET is set to be ON successively by determination unit 172B at a cycle of successive predetermined number of times (for example, 3 times) of phase signal PHA. Then, when it is detected that abnormality flag DET is set to be ON successively for a predetermined times, malfunction preventing unit 173B settles occurrence of an abnormality in the wire and outputs abnormality signal ALM in response. This abnormality signal ALM is received by an abnormality notifying unit provided outside or inside of drive circuit 100B, so that occurrence of an abnormality is notified to a user.

As described above, when switching of phase signal PHA is not performed, and the stopped state of stepping motor 200 continues, occurrence of the abnormality in the wire may be settled in the case where abnormality flag DET determined at predetermined time intervals indicates the abnormal state successively for a predetermined number of times.

Figure 12:
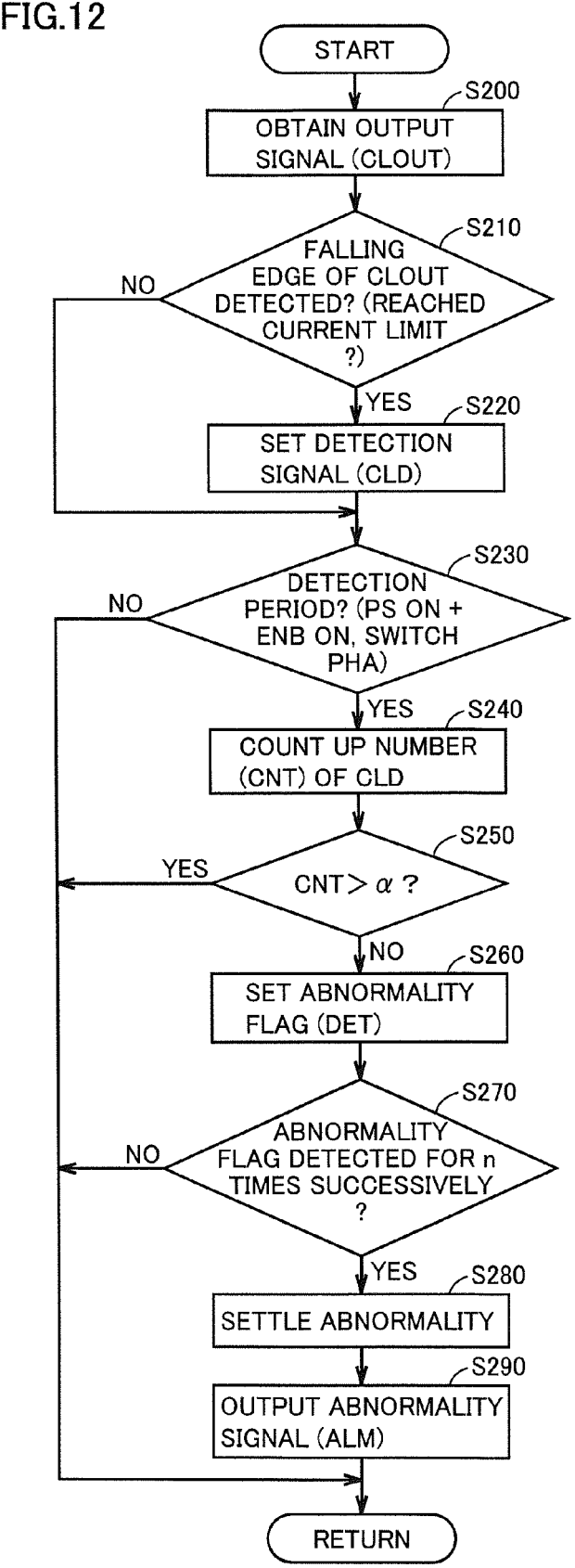
FIG. 12 represents a flowchart for describing details of an abnormality detection control processing executed by the abnormality detecting unit in the third embodiment.

FIG. 12 represents a flowchart for describing details of the abnormality detection control processing executed by abnormality detecting unit 170B in the third embodiment. As to the flowchart shown in FIG. 12, when the processing is executed by a programmable CPU (not illustrated) provided in abnormality detecting unit 170B, a program stored in advance in the CPU is invoked from a main routine and executed at predetermined cycles to thereby achieve the processing. Alternatively, as to a part of or all of the steps, the processing can be achieved by dedicated hardware (electronic circuit).

Referring to FIGS. 8 and 12, abnormality detecting unit 170B obtains, in Step (in the following, the term "step" will be abbreviated as "S") 200, output signal CLOUT from the comparator. Then, in S210, abnormality detecting unit 170B determines whether or not a falling edge of output signal CLOUT from ON to OFF is detected, in other words, whether or not excitation current IOUT has reached the current limit.

When a falling edge of output signal CLOUT is detected (YES in S210), abnormality detecting unit 170B sets, in S220, detection signal CLD of the channel to be ON. After that, the processing proceeds to S230.

When a falling edge of output signal CLOUT is not detected (NO in S210), S220 is skipped, and the processing proceeds to S230.

In S230, abnormality detecting unit 170B determines whether or not it is during a predetermined detection period determined based on phase signal PHA or power-saving signal PS and enable signal ENB.

When it is not during the predetermined detection period (NO in S230), abnormality detecting unit 170B terminates the processing, and the processing returns to the main routine.

When it is during the predetermined detection period (YES in S230), the processing proceeds to S240. Next, abnormality detecting unit 170B counts up the number CNT of the ON states of detection signal CLD during the detection period. Then, abnormality detecting unit 170B determines, in S250, whether or not the number CNT of the ON states of detection signal CLD is greater than a predetermined threshold value $\alpha$ at the end of the detection period.

When detection signal CLD is greater than threshold value $\alpha$ (YES in S250), excitation current IOUT is outputted. Therefore, abnormality detecting unit 170B determines that there is no occurrence of an abnormality on the current output path. Then, the processing is terminated and returns to the main routine.

On the other hand, when detection signal CLD is less than or equal to threshold value $\alpha$ (NO in S250), the processing proceeds to S260. Abnormality detecting unit 170B assumes that there is a possibility of occurrence of the wire abnormality, and sets abnormality flag DET of the corresponding channel to be ON.

Then, abnormality detecting unit 170B determines, in S270, whether or not this abnormality flag DET was detected successively for a predetermined number of times (n times: n is a natural number).

When abnormality flag DET has not been detected for the "n" number of times successively (NO in S270), abnormality detecting unit 170B determines that there is a high possibility of erroneous detection of the abnormal state.

When abnormality flag DET has been detected for the "n" number of times (YES in S270), the processing proceeds to S280, and abnormality detecting unit 170B settles that there is occurrence of a wire abnormality. Then, abnormality detecting unit 170B outputs abnormality signal ALM in S290.

By performing the control in accordance with such processing, an abnormality of the wire for supplying the excitation current to the stepping motor can be detected in the drive circuit of the stepping motor.

Fourth Embodiment

In drive circuit 100B of the stepping motor in accordance with the third embodiment, the configuration of providing phase signals PHA1, PHA2 and control signals I01, I11, I02, I12 from outside of drive circuit 100B was described. However, similarly to the second embodiment, these control signals may be generated inside the drive circuit.

In the fourth embodiment, description will be made on a drive circuit of a stepping motor having a function of generating the control signal inside based on information such as the control mode provided from outside.

Figure 13:
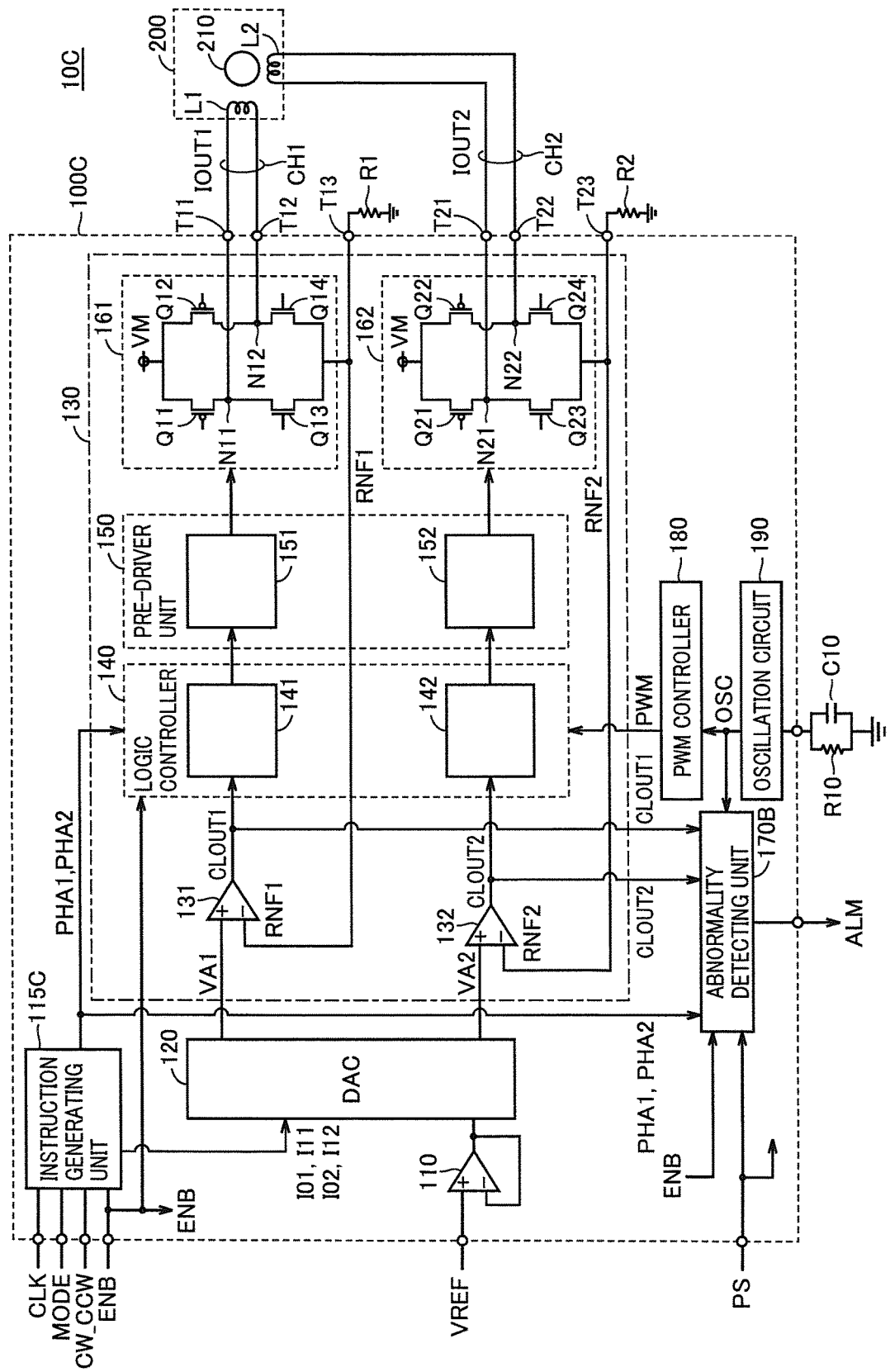
FIG. 13 represents an overall block diagram of a motor driving system including a drive circuit of a stepping motor in accordance with a fourth embodiment.

FIG. 13 represents an overall block diagram of motor driving system 10C including a drive circuit 100C of the stepping motor in accordance with the fourth embodiment. FIG. 13 has a configuration that an instruction generating unit 115C is added to drive circuit 100B described with reference to FIG. 8 of the third embodiment. In FIG. 13, description as to the elements overlapping with FIG. 8 will not be repeated.

Referring to FIG. 13, drive circuit 100C further includes instruction generating unit 115C in addition to the configuration of drive circuit 100B shown in FIG. 8.

Instruction generating unit 115C receives, from outside of the circuit, reference clock signal CLK, control mode signal MOD, a signal CW_CCW indicating a direction of rotation, and an enable signal ENB. Control mode signal MOD is a signal for determining which of the full-step mode, the half-step mode, and the quarter-step mode is to be selected.

Instruction generating unit 115C generates phase signals PHA1, PHA2 based on these information and outputs the same to logic controller 140 and abnormality detecting unit 170B. Further, instruction generating unit 115C generates control signals I01, I11, I02, I12 and outputs the same to D/A converter 120.

When these control signals are used only in the drive circuit, the configuration of providing the instruction generating unit inside the drive circuit as shown in FIG. 13 eliminates the necessity of providing additional circuit having a function corresponding to the instruction generating unit outside of the drive circuit. Therefore, there is an advantage that it can be applied for more applications.

Also as to the circuit having such a configuration, the abnormality detection control similar to that of the third embodiment can be applied.

Fifth Embodiment

In the third embodiment and the modified example thereof, description was made on the configuration of counting the number of times excitation current IOUT has reached target current IREF with use of voltage RNF to detect an abnormality of the wire for supplying the excitation current.

In the determination of whether or not the wire for supplying the excitation current is abnormal, it may be sufficient to detect a flow of current through the wire, and it is not always necessary that excitation current IOUT reaches target current IREF as an upper limit value.

In the fifth embodiment, description will be made on the configuration of detecting an abnormality of the wire for supplying the excitation current based on the comparison between voltage RNF indicating excitation current IOUT and a reference voltage different from target voltage VA.

Figure 14:
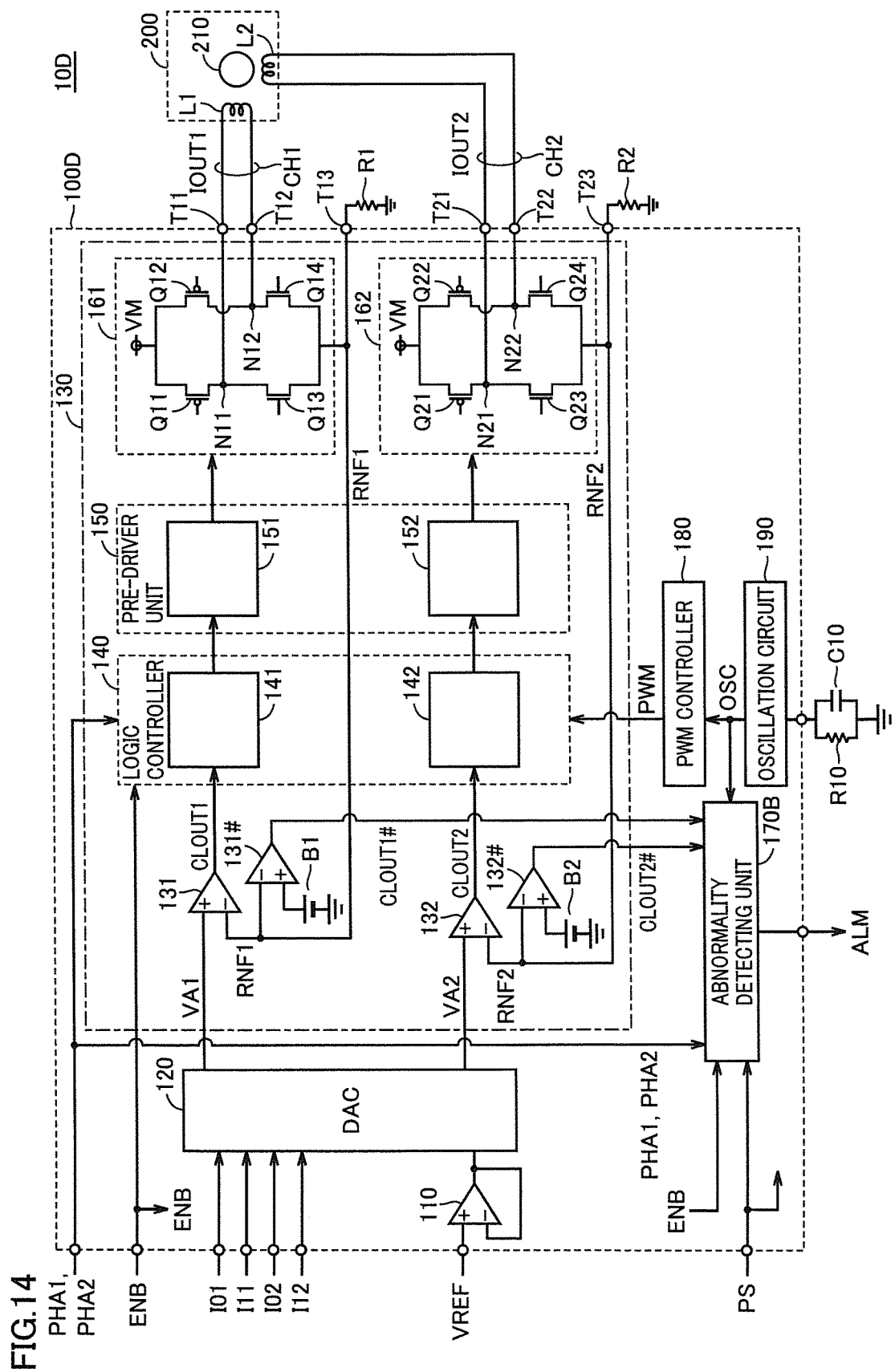
FIG. 14 represents an overall block diagram of a motor driving system including a drive circuit of a stepping motor in accordance with a fifth embodiment.

FIG. 14 represents an overall block diagram of a motor driving system 10D including a drive circuit 100D of the stepping motor in accordance with the fifth embodiment. FIG. 14 shows the configuration that comparators 131#, 132# are added to drive circuit 100B described with reference to FIG. 8 of the third embodiment. In FIG. 14, description as to the elements overlapping with FIG. 8 will not be repeated.

Referring to FIG. 14, drive circuit 100D further includes comparators 131#, 132# in addition to the configuration of drive circuit 100B shown in FIG. 8.

Comparator 131# compares a voltage of a reference voltage source B1 and voltage RNF1 indicating excitation current IOUT1 and generates an output signal CLOUT1# indicating a result of comparison. When voltage RNF1 has reached a reference voltage, comparator 131# sets output signal CLOUT1# to be OFF. When voltage RNF1 has not reached the reference voltage, comparator 131# sets output signal CLOUT1# to be ON. Comparator 131# outputs output signal CLOUT1# to abnormality detecting unit 170B.

Comparator 132# compares a voltage of a reference voltage source B2 and voltage RNF2 indicating excitation current IOUT2 and generates an output signal CLOUT2# indicating a result of comparison. When voltage RNF2 has reached the reference voltage, comparator 132# sets output signal CLOUT2# to be OFF. When voltage RNF2 has not reached the reference voltage, comparator 132# sets output signal CLOUT2# to be ON. Comparator 132# outputs output signal CLOUT2# to abnormality detecting unit 170B.

The voltages of reference voltage sources B1, B2 is set to be less than target voltage VA. The voltages of reference voltage sources B1, B2 are set based on, for example, a minimum set current value of stepping motor 200 determined depending on a use application. More preferably, the reference voltage is set to be a value less than the minimum set current value. As an example, when a use current range of stepping motor 200 is 100 mA-1 A (in other words, the minimum set current value is 100 mA), the reference voltage is set to be a value corresponding to a current value of 30-50 mA.

Abnormality detecting unit 170B receives output signals CLOUT1#, CLOUT2# from comparators 131#, 132#. Abnormality detecting unit 170B detects the number of times of OFF states of output signals CLOUT1#, CLOUT2# within a predetermined period similarly to the case of the third embodiment to detect an abnormality of the wire for supplying the excitation current.

Figure 15:
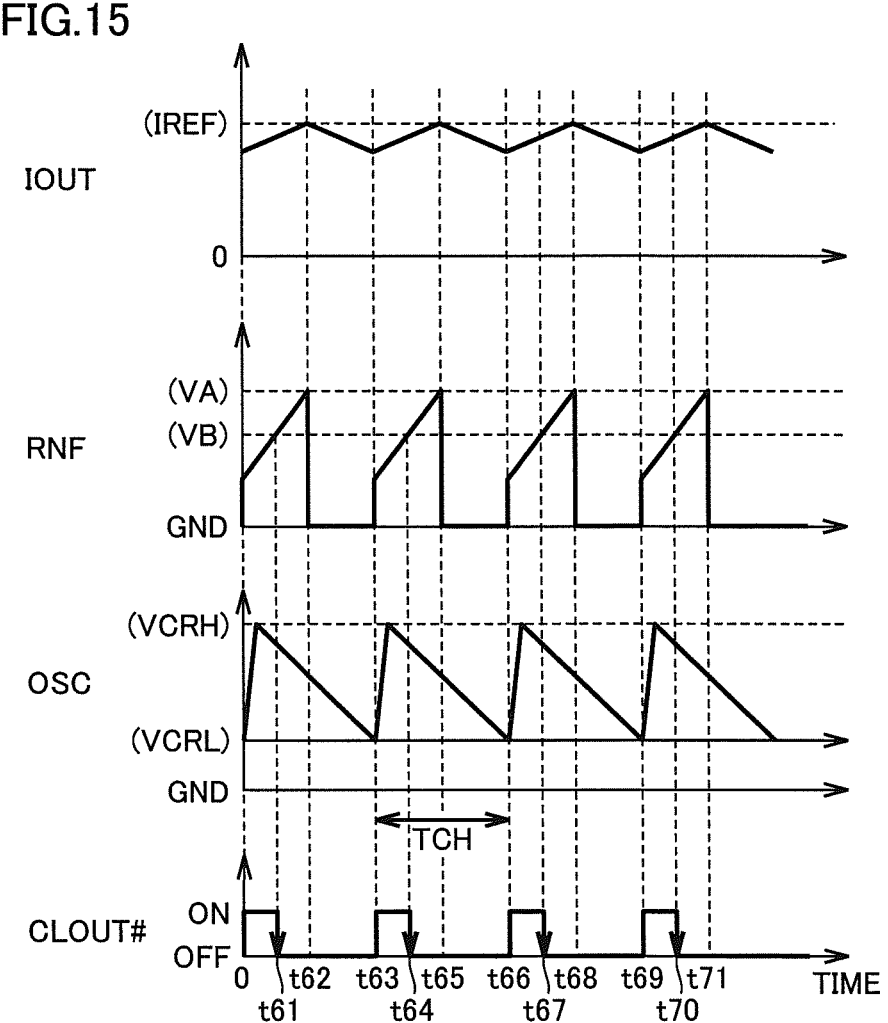
FIG. 15 represents a time chart for describing an abnormality detection control in the fifth embodiment.

FIG. 15 represents a time chart corresponding to FIG. 10 of the third embodiment. In FIG. 15, output signal CLOUT in FIG. 10 is replaced with an output signal CLOUT# (hereinafter, output signals CLOUT1#, CLOUT2# will be collectively referred to as "CLOUT#").

In FIG. 15, output signal CLOUT# is switched from ON to OFF when voltage RNF has reached reference voltage VB lower than target voltage VA (time t61, t64, t67, t70).

Figure 16:
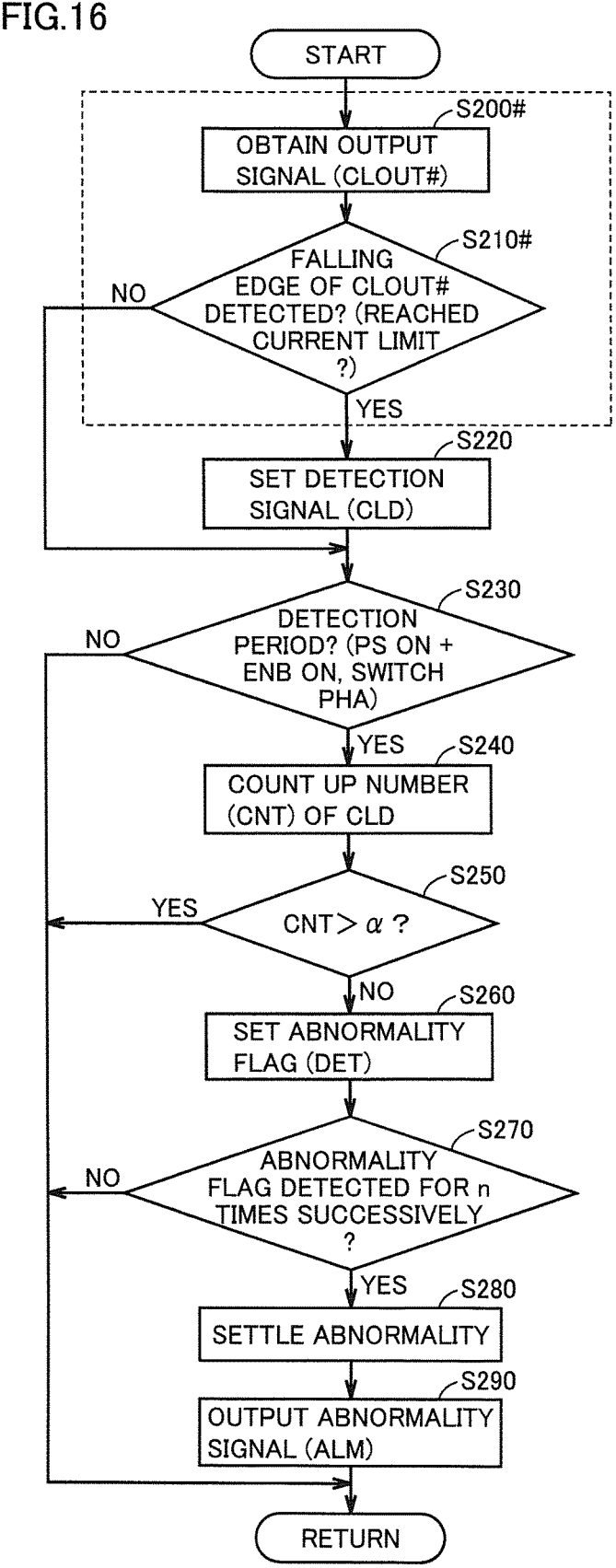
FIG. 16 represents a flowchart for describing details of an abnormality detection control processing executed by the abnormality detecting unit in the fifth embodiment.

FIG. 16 is a flowchart for describing the abnormality detection control processing executed by abnormality detecting unit 170B in the fifth embodiment. In FIG. 16, Steps S200, S201 shown in FIG. 12 of the third embodiment are replaced with S200#, S210#, and detection signal CLD is set (S220) based on output signals CLOUT1#, CLOUT2# from comparators 131#, 132# in place of output signals CLOUT1, CLOUT2 from comparators 131, 132. The processing subsequent to S220 is the same as those described with reference to FIG. 12. Therefore, description will not be repeated.

The configuration of determining whether or not the excitation current smaller than the minimum set current value with use of the additional comparators as described above requires additional elements and increases the number of parts. However, since the abnormality of the wire for supplying the excitation current can be detected even thought voltage RNF has not reached target voltage VA as the upper limit value of excitation current IOUT, there is an advantage that an abnormality can be detected more assuredly as compared to the third embodiment.

Further, the fifth embodiment may also have the configuration of providing the instruction generating unit inside the drive circuit like the fourth embodiment.

The drive circuits shown in the first to fifth embodiments may have a configuration of constructing a circuit included therein and a part or all of the function with use of individual electronic equipment, or may have a configuration of constructing a whole circuit as an integrated circuit totally integrating these circuits.

It is to be understood that the embodiments disclosed herein are only by way of example, and not to be taken by way of limitation. The scope of the present invention is not limited by the description above, but rather by the terms of the appended claims, and is intended to include any modifications within the scope and meaning equivalent to the terms of the claims.

REFERENCE SIGNS LIST 10, 10A-10D motor driving system; 100, 100A-100D drive circuit; 110 input buffer; 115, 115C instruction generating unit; 120 D/A converter; 130 current control circuit; 131, 131#, 132, 132# comparator; 140 logic controller; 141, 142 logic circuit; 150 pre-driver unit; 151, 152 pre-driver; 161, 162 H-bridge; 170 170B abnormality detecting unit; 171, 171B current limit detector; 172, 172B determination unit; 173, 173B malfunction preventing unit; 180 PWM controller; 190 oscillation circuit; 200 stepping motor; 210 rotor; B1, B2 reference voltage; C10 capacitor; CH1, CH2 channel; L1, L2 excitation coil; N11, N12, N21, N22 node; Q11-Q14, Q21-Q24 transistor; R1, R2, R10 resistor; T11-T13, T21-T23 terminal.

The invention claimed is:

1. A drive circuit of a stepping motor comprising:
   a drive unit configured to switch a level of an excitation current to the stepping motor based on an phase signal;
   a target voltage generating unit configured to generate a target voltage for determining a target value of the excitation current, when the excitation current flowing into the stepping motor is maintained at the same level;
   a current controller configured to control the excitation current so as to maintain a value of the excitation current at the target value based on the target voltage;
   an oscillation circuit configured to generate an oscillation signal which has an oscillation cycle shorter than a switching cycle of the level of the excitation current;
   a logic controller configured to turn the drive unit on and off based on the oscillation signal and an output reversal of a comparing unit within a first period in which the excitation current flowing into the stepping motor is to be maintained at the same level, the comparing unit being configured to reverse its output based on a comparison between a signal varying in accordance with turning the drive unit on and off by the logic controller and the target voltage; and
   an abnormality detecting unit configured to detect a state, where the output reversal of the comparing unit does not occur within a predetermined period that is shorter than the first period, as an abnormal state.

2. The drive circuit of a stepping motor according to claim 1, wherein the abnormality detecting unit is configured to detect the abnormality state when the output reversal does not occur more than a prescribed times.

3. The drive circuit of a stepping motor according to claim 2, wherein the abnormality detecting unit is configured to detect that the abnormality occurs when the number of times of the output reversal is less than a predetermined reference number.

4. The drive circuit of a stepping motor according to claim 1, wherein the abnormality detecting unit determines the abnormality state in response to successive detections of the abnormality state for a predetermined times.

5. The drive circuit of a stepping motor according to claim 1, wherein the target voltage generating unit generates the target voltage by dividing an upper limit value of the target value in accordance with a ratio changing in a stepwise manner from 0 to 1, the upper limit value being 1.

6. The drive circuit of a stepping motor according to claim 5, further comprising an instruction generating unit configured to generate a signal indicating the ratio based on information from outside of the drive circuit.

7. A method for controlling a drive circuit of a stepping motor, the method comprising:
   switching a level of an excitation current to the stepping motor based on an phase signal by a drive unit;
   generating a target voltage for determining a target value of the excitation current, when the excitation current flowing into the stepping motor is maintained at the same level;
   controlling the excitation current so as to maintain a value of the excitation current at the target value based on the target voltage;
   generating an oscillation signal which has an oscillation cycle shorter than a switching cycle of the level of the excitation current;
   turning the drive unit on and off based on the oscillation signal and an output reversal of a comparing unit within a first period during which the excitation current flowing into the stepping motor is to be maintained at the same level;
   reversing an output of the comparing unit based on a comparison between a signal varying in accordance with turning the drive unit on and off and the target voltage; and
   detecting a state, where the output reversal does not occur within a predetermined period shorter than the first period, as an abnormal state.

* * * * *